US012110075B2

(12) United States Patent
Odinaev et al.

(10) Patent No.: US 12,110,075 B2
(45) Date of Patent: Oct. 8, 2024

(54) PROVIDING A PREDICTION OF A RADIUS OF A MOTORCYCLE TURN

(71) Applicant: AUTOBRAINS TECHNOLOGIES LTD, Tel Aviv-Jaffa (IL)

(72) Inventors: Karina Odinaev, Tel Aviv (IL); Igal Raichelgauz, Tel Aviv (IL)

(73) Assignee: AUTOBRAINS TECHNOLOGIES LTD., Tel Aviv-Jaffa (IL)

( * ) Notice: Subject to any disclaimer, the term of this patent is extended or adjusted under 35 U.S.C. 154(b) by 238 days.

(21) Appl. No.: 17/817,936

(22) Filed: Aug. 5, 2022

(65) Prior Publication Data
US 2023/0040317 A1 Feb. 9, 2023

Related U.S. Application Data

(60) Provisional application No. 63/203,989, filed on Aug. 5, 2021.

(51) Int. Cl.
*B62J 45/20* (2020.01)
*B62J 27/00* (2020.01)
*B62J 50/21* (2020.01)
*G05D 1/00* (2006.01)

(52) U.S. Cl.
CPC ............... *B62J 45/20* (2020.02); *B62J 27/00* (2013.01); *B62J 50/21* (2020.02); *G05D 1/0212* (2013.01)

(58) Field of Classification Search
CPC . B62J 45/20; B62J 50/21; B62J 27/00; G05D 1/0212
See application file for complete search history.

(56) References Cited

U.S. PATENT DOCUMENTS

| 4,601,395 A | 7/1986 | Juvinall et al. |
| 4,733,353 A | 3/1988 | Jaswa |
| 4,932,645 A | 6/1990 | Schorey et al. |
| 4,972,363 A | 11/1990 | Nguyen et al. |
| 5,078,501 A | 1/1992 | Hekker et al. |

(Continued)

FOREIGN PATENT DOCUMENTS

| AU | 2007201966 B2 | 2/2010 |
| CN | 101539530 A | 9/2009 |

(Continued)

OTHER PUBLICATIONS

Vallet et al ("Personalized Content Retrieval in Context Using Ontological Knowledge" Mar. 2007) (Year: 2007).

(Continued)

*Primary Examiner* — Jacob M Amick
(74) *Attorney, Agent, or Firm* — Reches Patents

(57) ABSTRACT

A method for providing a prediction of a radius of a motorcycle turn, the method may include determining that the motorcycle is about to turn; predicting values of multiple radius of turn impacting (RTI) parameters; wherein the multiple RTI parameters are selected out of a group of parameters, wherein the selection was made during a machine learning training process, and the group of parameters comprises motorcycle kinematic parameters; determining, based on the determined values of the multiple RTI parameters, the estimated radius of the motorcycle turn; and performing a driving related operation based on the estimated radius of the motorcycle turn.

20 Claims, 20 Drawing Sheets

(56) References Cited

U.S. PATENT DOCUMENTS

| | | |
|---|---|---|
| 5,214,746 A | 5/1993 | Fogel et al. |
| 5,307,451 A | 4/1994 | Clark |
| 5,369,773 A | 11/1994 | Hammerstrom |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador, I et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 5,999,637 A | 12/1999 | Toyoda et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,459,991 B1 | 10/2002 | Takiguchi et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igar |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,026,944 B1 | 9/2011 | Sah |
| 8,266,185 B2 | 9/2012 | Raichelgauz et al. |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| 8,442,321 B1 | 5/2013 | Chang et al. |
| 8,457,827 B1 | 6/2013 | Ferguson et al. |
| 8,495,489 B1 | 7/2013 | Everingham |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| RE44,963 E | 6/2014 | Shannon |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,235,557 B2 | 1/2016 | Raichelgauz et al. |
| 9,286,623 B2 | 3/2016 | Raichelgauz et al. |
| 9,311,308 B2 | 4/2016 | Sankarasubramaniam et al. |
| 9,323,754 B2 | 4/2016 | Ramanathan et al. |
| 9,392,324 B1 | 7/2016 | Maltar et al. |
| 9,416,499 B2 | 8/2016 | Cronin et al. |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,807,442 B2 | 10/2017 | Bhatia et al. |
| 9,863,928 B1 | 1/2018 | Peterson et al. |
| 9,875,445 B2 | 1/2018 | Amer et al. |
| 9,953,533 B1 | 4/2018 | Graves |
| 9,953,535 B1 | 4/2018 | Canavor et al. |
| 9,984,369 B2 | 5/2018 | Li et al. |
| 10,048,700 B1 | 8/2018 | Curlander et al. |
| 10,157,291 B1 | 12/2018 | Kenthapadi et al. |
| 10,235,882 B1 | 3/2019 | Aoude et al. |
| 10,253,468 B1 | 4/2019 | Linville et al. |
| 10,395,332 B1 | 8/2019 | Konrardy et al. |
| 10,414,398 B2 | 9/2019 | Ochi |
| 10,416,670 B1 | 9/2019 | Fields et al. |
| 10,417,914 B1 | 9/2019 | Vose et al. |
| 10,467,893 B1 | 11/2019 | Soryal et al. |
| 10,545,023 B1 | 1/2020 | Herbach et al. |
| 10,684,626 B1 | 6/2020 | Martin |
| 10,916,124 B2 | 2/2021 | Geisler |
| 10,922,788 B1 | 2/2021 | Yu et al. |
| 10,967,877 B2 | 4/2021 | Asakura et al. |

(56) References Cited

U.S. PATENT DOCUMENTS

| | | |
|---|---|---|
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0181336 A1 | 12/2002 | Shields |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0145002 A1 | 7/2003 | Kleinberger et al. |
| 2003/0158839 A1 | 8/2003 | Faybishenko et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0257233 A1 | 12/2004 | Proebsting |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0149369 A1 | 7/2005 | Sevdermish |
| 2005/0163375 A1 | 7/2005 | Grady |
| 2005/0172130 A1 | 8/2005 | Roberts |
| 2005/0177372 A1 | 8/2005 | Wang et al. |
| 2005/0193093 A1 | 9/2005 | Mathew et al. |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0074588 A1 | 4/2006 | Blodgett et al. |
| 2006/0080311 A1 | 4/2006 | Potok et al. |
| 2006/0093190 A1 | 5/2006 | Cheng et al. |
| 2006/0112035 A1 | 5/2006 | Cecchi et al. |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0253423 A1 | 11/2006 | McLane et al. |
| 2006/0267975 A1 | 11/2006 | Moses et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0081088 A1 | 4/2007 | Gotoh et al. |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0244902 A1 | 10/2007 | Seide et al. |
| 2007/0253594 A1 | 11/2007 | Lu et al. |
| 2007/0282513 A1 | 12/2007 | Michi et al. |
| 2007/0294187 A1 | 12/2007 | Scherrer |
| 2007/0298152 A1 | 12/2007 | Baets |
| 2008/0006615 A1 | 1/2008 | Rosario et al. |
| 2008/0049789 A1 | 2/2008 | Vedantham et al. |
| 2008/0071465 A1 | 3/2008 | Chapman et al. |
| 2008/0072256 A1 | 3/2008 | Boicey et al. |
| 2008/0079729 A1 | 4/2008 | Brailovsky |
| 2008/0152231 A1 | 6/2008 | Gokturk et al. |
| 2008/0159622 A1 | 7/2008 | Agnihotri et al. |
| 2008/0161986 A1 | 7/2008 | Breed |
| 2008/0165018 A1 | 7/2008 | Breed |
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228749 A1 | 9/2008 | Brown |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0294278 A1 | 11/2008 | Borgeson et al. |
| 2008/0307454 A1 | 12/2008 | Ahanger et al. |
| 2008/0313140 A1 | 12/2008 | Pereira et al. |
| 2009/0024641 A1 | 1/2009 | Quigley et al. |
| 2009/0037088 A1 | 2/2009 | Taguchi |
| 2009/0043637 A1 | 2/2009 | Eder |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz et al. |
| 2009/0220138 A1 | 9/2009 | Zhang et al. |
| 2009/0232361 A1 | 9/2009 | Miller |
| 2009/0234878 A1 | 9/2009 | Herz et al. |
| 2009/0245573 A1 | 10/2009 | Saptharishi et al. |
| 2009/0254572 A1 | 10/2009 | Redlich et al. |
| 2009/0282218 A1 | 11/2009 | Raichelgauz et al. |
| 2009/0297048 A1 | 12/2009 | Slotine et al. |
| 2010/0010751 A1 | 1/2010 | Blodgett et al. |

(56) References Cited

U.S. PATENT DOCUMENTS

| | | |
|---|---|---|
| 2010/0010752 A1 | 1/2010 | Blodgett et al. |
| 2010/0030474 A1 | 2/2010 | Sawada |
| 2010/0035648 A1 | 2/2010 | Huang |
| 2010/0042646 A1 | 2/2010 | Raichelgauz et al. |
| 2010/0049374 A1 | 2/2010 | Ferrin et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0161652 A1 | 6/2010 | Bellare et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0262609 A1 | 10/2010 | Raichelgauz et al. |
| 2010/0284604 A1 | 11/2010 | Chrysanthakopoulos |
| 2010/0293057 A1 | 11/2010 | Haveliwala et al. |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0035373 A1 | 2/2011 | Berg et al. |
| 2011/0055585 A1 | 3/2011 | Lee |
| 2011/0060496 A1 | 3/2011 | Nielsen et al. |
| 2011/0077028 A1 | 3/2011 | Wilkes, III et al. |
| 2011/0164180 A1 | 7/2011 | Lee |
| 2011/0164810 A1 | 7/2011 | Zang et al. |
| 2011/0190972 A1 | 8/2011 | Timmons et al. |
| 2011/0216209 A1 | 9/2011 | Fredlund et al. |
| 2011/0218946 A1 | 9/2011 | Stern et al. |
| 2011/0276680 A1 | 11/2011 | Rimon |
| 2011/0296315 A1 | 12/2011 | Lin et al. |
| 2011/0307542 A1 | 12/2011 | Wang et al. |
| 2012/0041969 A1 | 2/2012 | Priyadarshan et al. |
| 2012/0131454 A1 | 5/2012 | Shah |
| 2012/0136853 A1 | 5/2012 | Kennedy et al. |
| 2012/0155726 A1 | 6/2012 | Li et al. |
| 2012/0167133 A1 | 6/2012 | Carroll et al. |
| 2012/0179642 A1 | 7/2012 | Sweeney et al. |
| 2012/0185445 A1 | 7/2012 | Borden et al. |
| 2012/0207346 A1 | 8/2012 | Kohli et al. |
| 2012/0219191 A1 | 8/2012 | Benzarti et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0151522 A1 | 6/2013 | Aggarwal et al. |
| 2013/0159298 A1 | 6/2013 | Mason et al. |
| 2013/0211705 A1 | 8/2013 | Geelen et al. |
| 2013/0226930 A1 | 8/2013 | Arngren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0037138 A1 | 2/2014 | Sato et al. |
| 2014/0125703 A1 | 5/2014 | Roveta et al. |
| 2014/0139670 A1 | 5/2014 | Kesavan et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0195093 A1 | 7/2014 | Litkouhi et al. |
| 2014/0198986 A1 | 7/2014 | Marchesotti |
| 2014/0201126 A1 | 7/2014 | Zadeh et al. |
| 2014/0201330 A1 | 7/2014 | Lopez et al. |
| 2014/0236414 A1 | 8/2014 | Droz et al. |
| 2014/0247342 A1 | 9/2014 | Ellenby et al. |
| 2014/0250032 A1 | 9/2014 | Huang et al. |
| 2014/0282655 A1 | 9/2014 | Roberts |
| 2014/0288453 A1 | 9/2014 | Liu et al. |
| 2014/0300722 A1 | 10/2014 | Garcia |
| 2014/0328512 A1 | 11/2014 | Gurwicz et al. |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2015/0052089 A1 | 2/2015 | Kozloski et al. |
| 2015/0057869 A1 | 2/2015 | Healey et al. |
| 2015/0071457 A1 | 3/2015 | Burciu |
| 2015/0100562 A1 | 4/2015 | Kohlmeier et al. |
| 2015/0117784 A1 | 4/2015 | Lin et al. |
| 2015/0120627 A1 | 4/2015 | Hunzinger et al. |
| 2015/0120760 A1 | 4/2015 | Wang et al. |
| 2015/0123968 A1 | 5/2015 | Holverda et al. |
| 2015/0127516 A1 | 5/2015 | Studnitzer et al. |
| 2015/0130643 A1 | 5/2015 | Nagy |
| 2015/0153735 A1 | 6/2015 | Clarke et al. |
| 2015/0166069 A1 | 6/2015 | Engelman et al. |
| 2015/0190284 A1 | 7/2015 | Censo et al. |
| 2015/0203116 A1 | 7/2015 | Fairgrieve et al. |
| 2015/0213325 A1 | 7/2015 | Krishnamoorthi et al. |
| 2015/0224988 A1 | 8/2015 | Buerkle et al. |
| 2015/0248586 A1 | 9/2015 | Gaidon et al. |
| 2015/0254344 A1 | 9/2015 | Kulkarni et al. |
| 2015/0266455 A1 | 9/2015 | Wilson |
| 2015/0286742 A1 | 10/2015 | Zhang et al. |
| 2015/0286872 A1 | 10/2015 | Medioni et al. |
| 2015/0293976 A1 | 10/2015 | Guo et al. |
| 2015/0324356 A1 | 11/2015 | Gutierrez et al. |
| 2015/0332588 A1 | 11/2015 | Bulan et al. |
| 2016/0007083 A1 | 1/2016 | Gurha |
| 2016/0026707 A1 | 1/2016 | Ong et al. |
| 2016/0046298 A1 | 2/2016 | Deruyck et al. |
| 2016/0078339 A1 | 3/2016 | Li et al. |
| 2016/0127641 A1 | 5/2016 | Gove |
| 2016/0132194 A1 | 5/2016 | Grue et al. |
| 2016/0133130 A1 | 5/2016 | Grimm et al. |
| 2016/0142625 A1 | 5/2016 | Weksler et al. |
| 2016/0193996 A1 | 7/2016 | Stefan |
| 2016/0221592 A1 | 8/2016 | Puttagunta et al. |
| 2016/0275766 A1 | 9/2016 | Venetianer et al. |
| 2016/0284095 A1 | 9/2016 | Chalom et al. |
| 2016/0302046 A1 | 10/2016 | Velusamy |
| 2016/0306798 A1 | 10/2016 | Guo et al. |
| 2016/0330394 A1 | 11/2016 | Shahraray et al. |
| 2016/0355181 A1 | 12/2016 | Teraoka et al. |
| 2016/0379091 A1 | 12/2016 | Lin et al. |
| 2017/0007521 A1 | 1/2017 | Monsonis et al. |
| 2017/0008521 A1 | 1/2017 | Braunstein et al. |
| 2017/0017638 A1 | 1/2017 | Satyavarta et al. |
| 2017/0018178 A1 | 1/2017 | Poechmueller et al. |
| 2017/0072851 A1 | 3/2017 | Shenoy et al. |
| 2017/0075036 A1 | 3/2017 | Pikhletsky et al. |
| 2017/0078621 A1 | 3/2017 | Sahay et al. |
| 2017/0090473 A1 | 3/2017 | Cooper et al. |
| 2017/0092122 A1 | 3/2017 | Sharan |
| 2017/0111576 A1 | 4/2017 | Tojo et al. |
| 2017/0136842 A1 | 5/2017 | Anderson et al. |
| 2017/0154241 A1 | 6/2017 | Shambik et al. |
| 2017/0180623 A1 | 6/2017 | Lin |
| 2017/0243370 A1 | 8/2017 | Hoye et al. |
| 2017/0263128 A1 | 9/2017 | Chandran et al. |
| 2017/0293296 A1 | 10/2017 | Stenneth et al. |
| 2017/0297401 A1 | 10/2017 | Hrovat et al. |
| 2017/0344023 A1 | 11/2017 | Laubinger et al. |
| 2017/0351268 A1 | 12/2017 | Anderson et al. |
| 2018/0022361 A1 | 1/2018 | Rao et al. |
| 2018/0025235 A1 | 1/2018 | Fridman |
| 2018/0046869 A1 | 2/2018 | Cordell et al. |
| 2018/0060690 A1 | 3/2018 | Lee et al. |
| 2018/0061253 A1 | 3/2018 | Hyun |
| 2018/0082591 A1 | 3/2018 | Pandy |

(56) References Cited

U.S. PATENT DOCUMENTS

| | | |
|---|---|---|
| 2018/0101177 A1 | 4/2018 | Cohen |
| 2018/0108258 A1 | 4/2018 | Dilger |
| 2018/0113461 A1 | 4/2018 | Potnis et al. |
| 2018/0144640 A1 | 5/2018 | Price et al. |
| 2018/0151073 A1 | 5/2018 | Minemura et al. |
| 2018/0157666 A1 | 6/2018 | Raichelgauz et al. |
| 2018/0157903 A1 | 6/2018 | Tu et al. |
| 2018/0170392 A1 | 6/2018 | Yang et al. |
| 2018/0174001 A1 | 6/2018 | Kang |
| 2018/0188731 A1 | 7/2018 | Matthiesen et al. |
| 2018/0188746 A1 | 7/2018 | Lesher et al. |
| 2018/0189613 A1 | 7/2018 | Wolf et al. |
| 2018/0204335 A1 | 7/2018 | Agata et al. |
| 2018/0210462 A1 | 7/2018 | Switkes et al. |
| 2018/0218608 A1 | 8/2018 | Offenhaeuser et al. |
| 2018/0268292 A1 | 9/2018 | Choi et al. |
| 2018/0338229 A1 | 11/2018 | Nemec et al. |
| 2018/0354505 A1 | 12/2018 | Meier et al. |
| 2018/0356817 A1 | 12/2018 | Poeppel |
| 2018/0373929 A1 | 12/2018 | Ye |
| 2019/0034764 A1 | 1/2019 | Oh et al. |
| 2019/0064929 A1 | 2/2019 | Tomeh et al. |
| 2019/0071093 A1 | 3/2019 | Ma et al. |
| 2019/0072965 A1 | 3/2019 | Zhang et al. |
| 2019/0072966 A1 | 3/2019 | Zhang et al. |
| 2019/0073908 A1 | 3/2019 | Neubecker et al. |
| 2019/0088135 A1 | 3/2019 | Do et al. |
| 2019/0096135 A1 | 3/2019 | Mutto et al. |
| 2019/0139419 A1 | 5/2019 | Wendt et al. |
| 2019/0147259 A1 | 5/2019 | Molin et al. |
| 2019/0163204 A1 | 5/2019 | Bai et al. |
| 2019/0171912 A1 | 6/2019 | Vallespi-Gonzalez et al. |
| 2019/0193751 A1 | 6/2019 | Fernando et al. |
| 2019/0196471 A1 | 6/2019 | Vaughn et al. |
| 2019/0205798 A1 | 7/2019 | Rosas-Maxemin et al. |
| 2019/0213324 A1 | 7/2019 | Thorn |
| 2019/0220011 A1 | 7/2019 | Penna |
| 2019/0225214 A1 | 7/2019 | Pohl et al. |
| 2019/0246042 A1 | 8/2019 | Liu |
| 2019/0253614 A1 | 8/2019 | Oleson et al. |
| 2019/0279426 A1 | 9/2019 | Han et al. |
| 2019/0279293 A1 | 9/2019 | Tang et al. |
| 2019/0287515 A1 | 9/2019 | Li et al. |
| 2019/0291720 A1 | 9/2019 | Xiao et al. |
| 2019/0304102 A1 | 10/2019 | Chen et al. |
| 2019/0311226 A1 | 10/2019 | Xiao et al. |
| 2019/0315346 A1 | 10/2019 | Yoo et al. |
| 2019/0337521 A1 | 11/2019 | Stauber |
| 2019/0340924 A1 | 11/2019 | Abari et al. |
| 2019/0347492 A1 | 11/2019 | Morimura et al. |
| 2019/0355132 A1 | 11/2019 | Kushleyev et al. |
| 2019/0378006 A1 | 12/2019 | Fukuda et al. |
| 2019/0384303 A1 | 12/2019 | Muller et al. |
| 2019/0392831 A1 | 12/2019 | Pohl |
| 2020/0012871 A1 | 1/2020 | Lee et al. |
| 2020/0027002 A1 | 1/2020 | Hickson et al. |
| 2020/0027351 A1 | 1/2020 | Gotoda et al. |
| 2020/0027355 A1 | 1/2020 | Sujan et al. |
| 2020/0053262 A1 | 2/2020 | Wexler et al. |
| 2020/0074326 A1 | 3/2020 | Balakrishnan et al. |
| 2020/0086881 A1 | 3/2020 | Abendroth et al. |
| 2020/0090426 A1 | 3/2020 | Barnes et al. |
| 2020/0110982 A1 | 4/2020 | Gou et al. |
| 2020/0117902 A1 | 4/2020 | Wexler et al. |
| 2020/0120267 A1 | 4/2020 | Netto et al. |
| 2020/0125927 A1 | 4/2020 | Kim |
| 2020/0156784 A1 | 5/2020 | Carnell |
| 2020/0175384 A1 | 6/2020 | Zhang et al. |
| 2020/0175550 A1 | 6/2020 | Raichelgauz et al. |
| 2020/0269864 A1 | 8/2020 | Zhang et al. |
| 2020/0272940 A1 | 8/2020 | Sun et al. |
| 2020/0293035 A1 | 9/2020 | Sakurada et al. |
| 2020/0302295 A1 | 9/2020 | Tung et al. |
| 2020/0304707 A1 | 9/2020 | Williams et al. |
| 2020/0324778 A1 | 10/2020 | Diamond et al. |
| 2020/0370890 A1 | 11/2020 | Hamilton et al. |
| 2020/0371518 A1 | 11/2020 | Kang |
| 2020/0410322 A1 | 12/2020 | Naphade et al. |
| 2021/0009270 A1 | 1/2021 | Chen et al. |
| 2021/0041248 A1 | 2/2021 | Li et al. |
| 2021/0049908 A1 | 2/2021 | Pipe et al. |
| 2021/0055741 A1 | 2/2021 | Kawanai et al. |
| 2021/0056492 A1 | 2/2021 | Zass |
| 2021/0056852 A1 | 2/2021 | Lund et al. |
| 2021/0096565 A1 | 4/2021 | Xie et al. |
| 2021/0097309 A1 | 4/2021 | Kaku et al. |
| 2021/0148831 A1 | 5/2021 | Raichelgauz et al. |
| 2021/0164177 A1 | 6/2021 | Wientjes |
| 2021/0182539 A1 | 6/2021 | Rassool |
| 2021/0192357 A1 | 6/2021 | Sinha et al. |
| 2021/0209332 A1 | 7/2021 | Nishio et al. |
| 2021/0224917 A1 | 7/2021 | Gaudin et al. |
| 2021/0248904 A1 | 8/2021 | Nguyen |
| 2021/0266437 A1 | 8/2021 | Wexler et al. |
| 2021/0272207 A1 | 9/2021 | Fields et al. |
| 2021/0284183 A1 | 9/2021 | Marenco et al. |
| 2021/0284191 A1 | 9/2021 | Raichelgauz et al. |
| 2021/0316747 A1 | 10/2021 | Klein |
| 2021/0390351 A1 | 12/2021 | Romain, II |
| 2021/0390840 A1 | 12/2021 | Rejal et al. |
| 2021/0409593 A1 | 12/2021 | Zacharias et al. |
| 2022/0005291 A1 | 1/2022 | Konrardy et al. |
| 2022/0038620 A1 | 2/2022 | Demers |
| 2022/0041158 A1* | 2/2022 | Notohardjono ......... G06F 30/27 |
| 2022/0058393 A1 | 2/2022 | Calvert et al. |
| 2022/0126864 A1 | 4/2022 | Moustafa et al. |
| 2022/0161815 A1 | 5/2022 | Beek et al. |
| 2022/0187847 A1 | 6/2022 | Cella et al. |
| 2022/0191389 A1 | 6/2022 | Lei |
| 2022/0234501 A1 | 7/2022 | Odinaev et al. |
| 2022/0286603 A1 | 9/2022 | Lv et al. |
| 2022/0327886 A1 | 10/2022 | Mathur et al. |
| 2022/0345621 A1 | 10/2022 | Shi et al. |

FOREIGN PATENT DOCUMENTS

| | | |
|---|---|---|
| CN | 107472252 B | 4/2022 |
| CN | 111866468 B | 6/2022 |
| DE | 102012009297 A1 | 12/2012 |
| DE | 102016122686 A1 | 5/2018 |
| EP | 1085464 A3 | 1/2007 |
| EP | 3910540 A1 | 11/2021 |
| JP | 2018511807 A | 4/2018 |
| WO | 0231764 A2 | 4/2002 |
| WO | 2003067467 A1 | 8/2003 |
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2014141282 A1 | 9/2014 |
| WO | 2016040376 A1 | 3/2016 |
| WO | 2016070193 A1 | 5/2016 |
| WO | 2018035145 A1 | 2/2018 |
| WO | 2018132088 A1 | 7/2018 |

OTHER PUBLICATIONS

Vallet, David, et al. "Personalized content retrieval in context using ontological knowledge." IEEE Transactions on circuits andsystems for video technology 17.3 (2007): 336-346. (Year: 2007).

Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.

Wang et al., "Classifying Objectionable Websites Based onImage Content", Stanford University, pp. 1-12.

Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.

Whitby-Strevens, "The transputer", 1985 IEEE, pp. 292-300.

(56) References Cited

OTHER PUBLICATIONS

Wilk et al., "The Potential of Social-Aware Multimedia Prefetching on Mobile Devices", International Conference and Workshops on networked Systems (NetSys), 2015, pp. 1-5.

Yanagawa et al, "Columbia University's Baseline Detectors for 374 LSCOM Semantic Visual Concepts", Columbia University Advent Technical Report # 222-2006-8, Mar. 20, 2007, pp. 1-17.

Yanagawa et al., "Columbia University's Baseline Detectors for 374 LSCOM Semantic Visual Concepts", Columbia University Advent Technical Report #222, 2007, pp. 2006-2008.

Yanai, Generic Image Classification Using Visual Knowledge on the Web, pp. 167-174 (Year: 2003).

Zhou et al., "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.

Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.

Zhu et al., "Technology-Assisted Dietary Assesment", Proc SPIE. Mar. 20, 2008, pp. 1-15.

Zou et al., "A Content-Based Image Authentication System with Lossless Data Hiding", ICME 2003, pp. 213-216.

"Computer Vision Demonstration Website", Electronics and Computer Science, University of Southampton, 2005, USA.

Big Bang Theory Series 04 Episode 12, aired Jan. 6, 2011; [retrieved from Internet: ].

Boari et al., "Adaptive Routing for Dynamic Applications in Massively Parallel Architectures", 1995 IEEE, Spring 1995, pp. 1-14.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

C. Huang et al., "ACT: An Autonomous Drone Cinematography System for Action Scenes," 2018 IEEE International Conference onRobotics and Automation (ICRA), 2018, pp. 7039-7046, doi: 10.1109/ICRA.2018.8460703. (Year: 2018).

Cernansky et al, "Feed-forward Echo State Networks", Proceedings of International Joint Conference on Neural Networks, Montreal, Canada, Jul. 31-Aug. 4, 2005, pp. 1-4.

Chinchor, Nancy A. et al.; Multimedia Analysis + Visual Analytics = Multimedia Analytics; IEEE Computer Society; 2010; pp. 52-60. (Year: 2010).

Fathy et al., "A Parallel Design and Implementation For Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Freisleben et al., "Recognition of Fractal Images Using a Neural Network", Lecture Notes in Computer Science, 1993, vol. 6861, 1993, pp. 631-637.

Galvane, Quentin, et al. "Automated cinematography with unmanned aerial vehicles." arXiv preprint arXiv:1712.04353 (2017). (Year: 2017).

Garcia, "Solving the Weighted Region Least Cost Path Problem Using Transputers", Naval Postgraduate School, Monterey, California, Dec. 1989.

Guo et al, AdOn: An Intelligent Overlay Video Advertising System (Year: 2009).

Hogue, "Tree Pattern Inference and Matching for Wrapper Induction on the World Wide Web", Master's Thesis, Massachusetts Institute of Technology, Jun. 2004, pp. 1-106.

Howlett et al., "A Multi-Computer Neural Network Architecture in a Virtual Sensor System Application", International journal of knowledge-based intelligent engineering systems, 4 (2). pp. 86-93, 133N 1327-2314.

Hu, Weiming, et al. "A survey on visual content-based video indexing and retrieval." IEEE Transactions on Systems, Man, andCybernetics, Part C (Applications and Reviews) 41.6 (2011 ): 797-819. (Year: 2011).

Hua et al., "Robust Video Signature Based on Ordinal Measure", Image Processing, 2004, 2004 International Conference on Image Processing (ICIP), vol. 1, IEEE, pp. 685-688, 2004.

Huang, Chong, et al. "One-shot imitation filming of human motion videos." arXiv preprint arXiv:1912.10609 (2019). (Year: 2019).

International Search Report and Written Opinion for PCT/US2016/050471, ISA/RU, Moscow, RU, Date of Mailing: May 4, 2017.

International Search Report and Written Opinion for PCT/US2016/054634, ISA/RU, Moscow, RU, Date of Mailing: Mar. 16, 2017.

International Search Report and Written Opinion for PCT/US2017/015831, ISA/RU, Moscow, RU, Date of Mailing: Apr. 20, 2017.

J. Chen and P. Carr, "Mimicking Human Camera Operators," 2015 IEEE Winter Conference on Applications of Computer Vision,2015, pp. 215-222, doi: 10.1109/WACV.2015.36. (Year: 2015).

Johnson et al., "Pulse-Coupled Neural Nets: Translation, Rotation, Scale, Distortion, and Intensity Signal Invariance for Images", Applied Optics, vol. 33, No. 26, 1994, pp. 6239-6253.

Joubert, Niels, et al. "Towards a drone cinematographer: Guiding quadrotor cameras using visual composition principles." arXivpreprint arXiv: 1610.01691 (2016). (Year: 2916).

Lau et al., "Semantic Web Service Adaptation Model for a Pervasive Learning Scenario", 2008 IEEE Conference on Innovative Technologies in Intelligent Systems and industrial Applications, 2008, pp. 98-103.

Li et al ("Matching Commercial Clips from TV Streams Using a Unique, Robust and Compact Signature" 2005) (Year: 2005).

Li, Yijun, Jesse S. Jin, and Xiaofang Zhou. "Matching commercial clips from TV streams using a unique, robust and compactsignature." Digital Image Computing: Techniques and Applications (DICTA'05). IEEE, 2005. (Year: 2005).

Lin et al., "Generating robust digital signature for image/video authentication", Multimedia and Security Workshop at ACM Multimedia '98, Bristol, U.K., Sep. 1998, pp. 245-251.

Lu et al., "Structural Digital Signature for Image Authentication: An Incidental Distortion Resistant Scheme", IEEE Transactions on Multimedia, vol. 5, No. 2, Jun. 2003, pp. 161-173.

Lyon, "Computational Models of Neural Auditory Processing", IEEE International Conference on Acoustics, Speech, and Signal Processing, ICASSP '84, Date of Conference: Mar. 1984, vol. 9, pp. 41-44.

M. Gschwindt,, "Can a Robot Become a Movie Director? Learning Artistic Principles for Aerial Cinematography," 2019 IEEE/RSJw International Conference on Intelligent Robots and Systems (IROS), 2019, pp. 1107-1114, doi: 10.1109/IROS40897.2019.896759 (Year: 2019).

Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.

May et al, "The Transputer", Springer-Verlag Berlin Heidelberg 1989, vol. 41.

McNamara et al., "Diversity Decay in opportunistic Content Sharing Systems", 2011 IEEE International Symposium on a World of Wireless, Mobile and Multimedia Networks, pp. 1-3.

Morad et al., "Performance, Power Efficiency and Scalability of Asymmetric Cluster Chip Multiprocessors", Computer Architecture Letters, vol. 4, Jul. 4, 2005, pp. 1-4, XP002466254.

Nagy et al, "A Transputer, Based, Flexible, Real-Time Control System for Robotic Manipulators", UKACC International Conference on Control '96, Sep. 2-5, 1996, Conference Publication No. 427, IEE 1996.

Natschlager et al., "The "Liquid Computer": A novel strategy for real-time computing on time series", Special Issue on Foundations of Information Processing of telematik, vol. 8, No. 1, 2002, pp. 39-43, XP002466253.

Odinaev et al., "Cliques in Neural Ensembles as Perception Carriers", Technion—Institute of Technology, 2006 International Joint Conference on neural Networks, Canada, 2006, pp. 285-292.

(56) References Cited

OTHER PUBLICATIONS

Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Retrieval, Story. Ehsan Younessian. Diss. Nanyang Technological University, 2013: i-187 (Year: 2013).
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al., "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al., "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al ("Hibrid-SOC: a Multi-Core SOC Architecture for Multimedia Signal Processing" 2003).
Stolberg et al., "Hibrid-SOC: a Multi-Core SOC Architecture for Mul Timedia Signal Processing", 2003 IEEE, pp. 189-194.
Theodoropoulos et al., "Simulating Asynchronous Architectures on Transputer Networks", Proceedings of the Fourth Euromicro Workshop on Parallel and Distributed Processing, 1996. PDP '96, pp. 274-281.

\* cited by examiner

Searching for overlaps between regions of interest (of the k'th iteration expansion operation results) and define regions of interest that are related to the overlaps 5031

Determine to drop one or more region of interest, and dropping according to the determination 5032

Searching for relationships between regions of interest (of the k'th iteration expansion operation results) and define regions of interest that are related to the relationship 5033

Searching for proximate regions of interest (of the k'th iteration expansion operation results) and define regions of interest that are related to the proximity 5034

Searching for relationships between regions of interest (of the k'th iteration expansion operation results) and define regions of interest that are related to the relationship 5035

Merging and/or dropping k'th iteration regions of interest based on shape information related to the k'th iteration regions of interest 5036

PROVIDING A PREDICTION OF A RADIUS OF A MOTORCYCLE TURN

BACKGROUND

The turning radius of a motorcycle is one of the most crucial aspects of its low-speed performance, especially where parking and U-turns are concerned. Just as with any motor vehicle, the turning circle has a direct connection with the wheelbase and the wheel's turning angle; a shorter wheelbase and higher angle equals a sharper turn, and a longer wheelbase and lower angle allows a wider turn. Further, speed and road type/condition also affect turning radius thus should be properly considered in the calculation.

There is a growing need to automatically calculate the turning radius.

SUMMARY

A method, system and non-transitory computer readable medium for providing a prediction of a radius of a motorcycle turn.

BRIEF DESCRIPTION OF THE DRAWINGS

The embodiments of the disclosure will be understood and appreciated more fully from the following detailed description, taken in conjunction with the drawings in which:

FIG. 1D illustrates an example of a merge operation;
FIG. 1O illustrates an example of a method.

DESCRIPTION OF EXAMPLE EMBODIMENTS

Figure 1A:
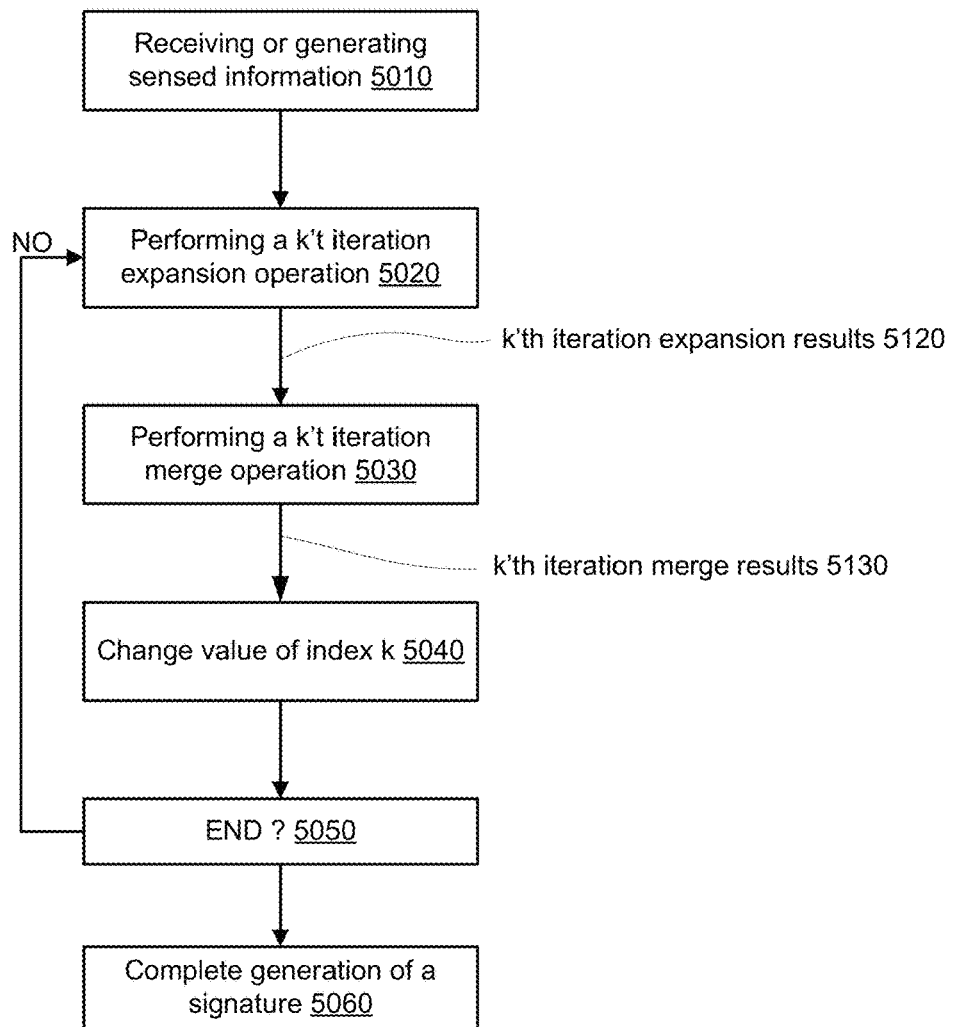
FIG. 1A illustrates an example of a method.

The specification and/or drawings may refer to an image. An image is an example of a media unit. Any reference to an image may be applied mutatis mutandis to a media unit. A media unit may be an example of sensed information. Any reference to a media unit may be applied mutatis mutandis to a natural signal such as but not limited to signal generated by nature, signal representing human behavior, signal representing operations related to the stock market, a medical signal, and the like. Any reference to a media unit may be applied mutatis mutandis to sensed information. The sensed information may be sensed by any type of sensors—such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided a system, a method and a non-transitory computer readable medium for estimating a radius of a motorcycle turn.

The method may be based on learning from previous turning examples, while involving all factors affecting the turning radius and thereby constituting an assistant system to the driver in the turning decision making process.

Figure 2:
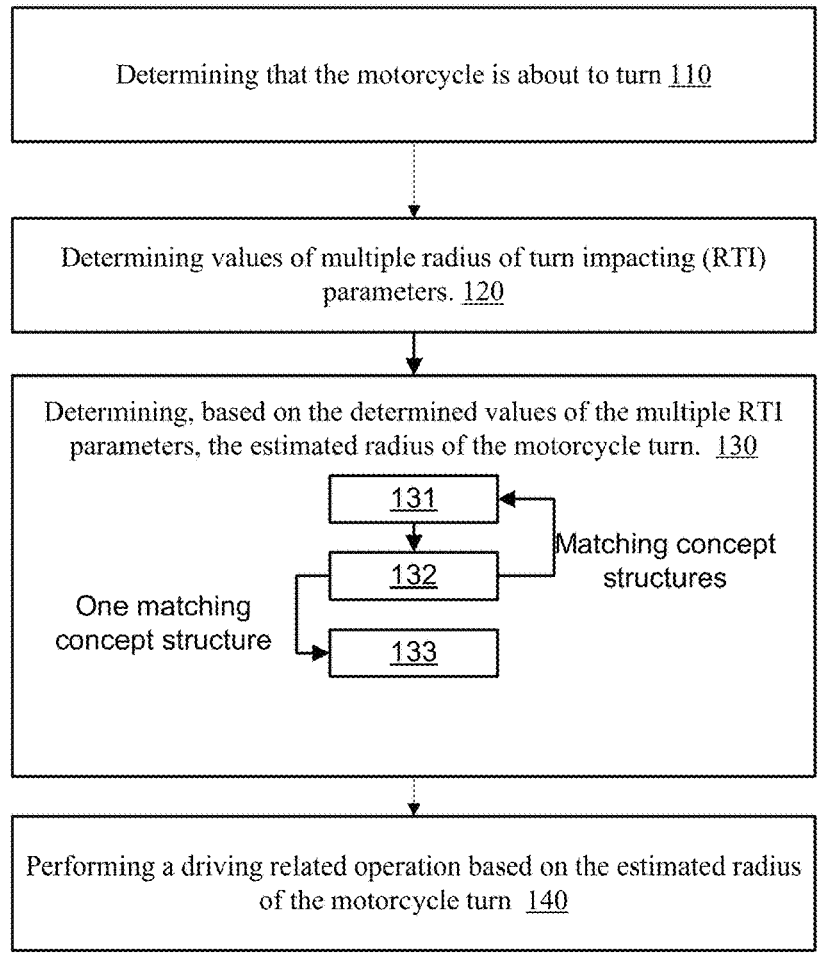
FIG. 2 illustrates an example of a method.
Figure 3:
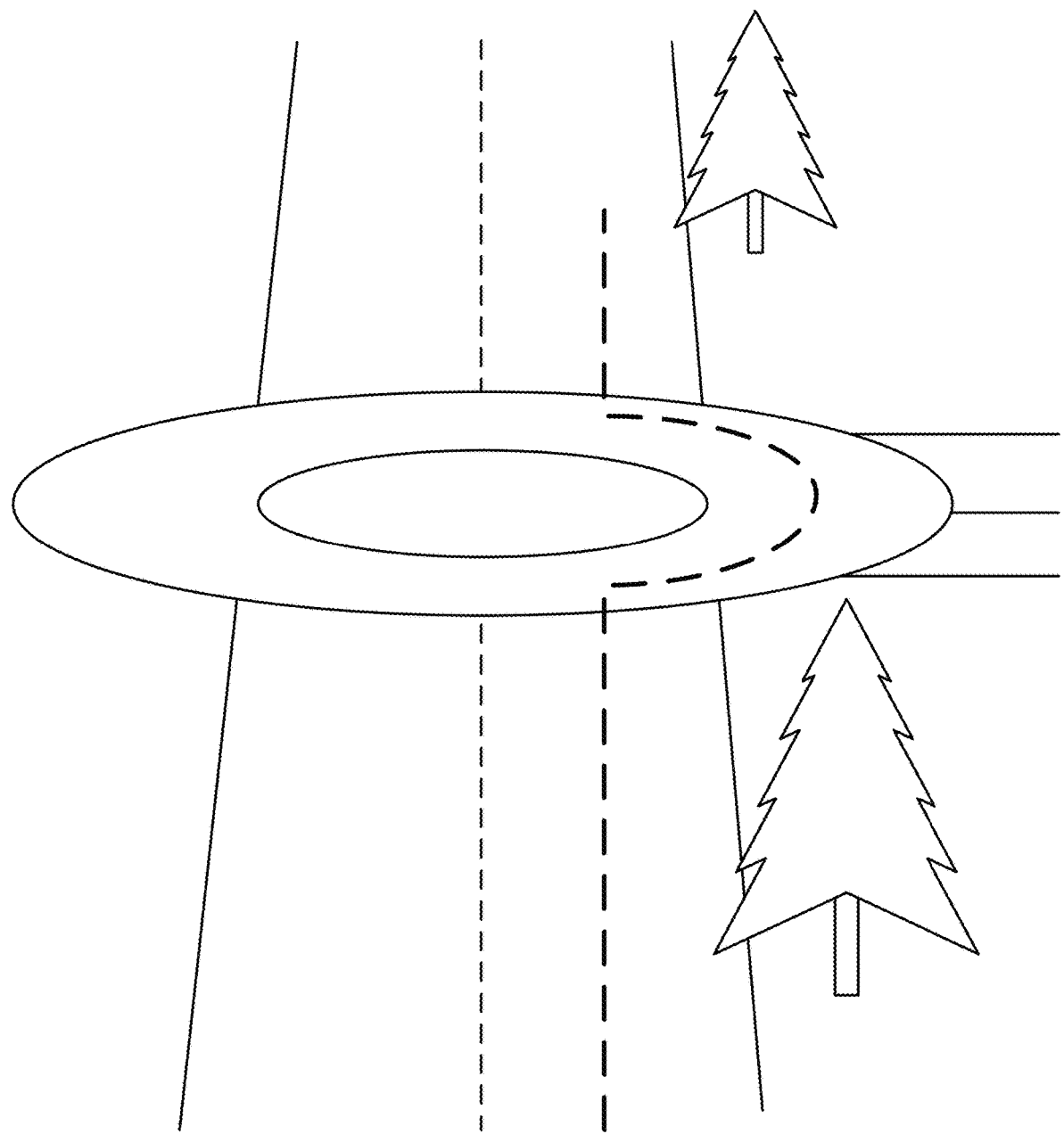
FIG. 3 illustrates an image of an environment of the motorcycle and a projected path calculated based on a determined radius of a motorcycle turn.
Figure 4:
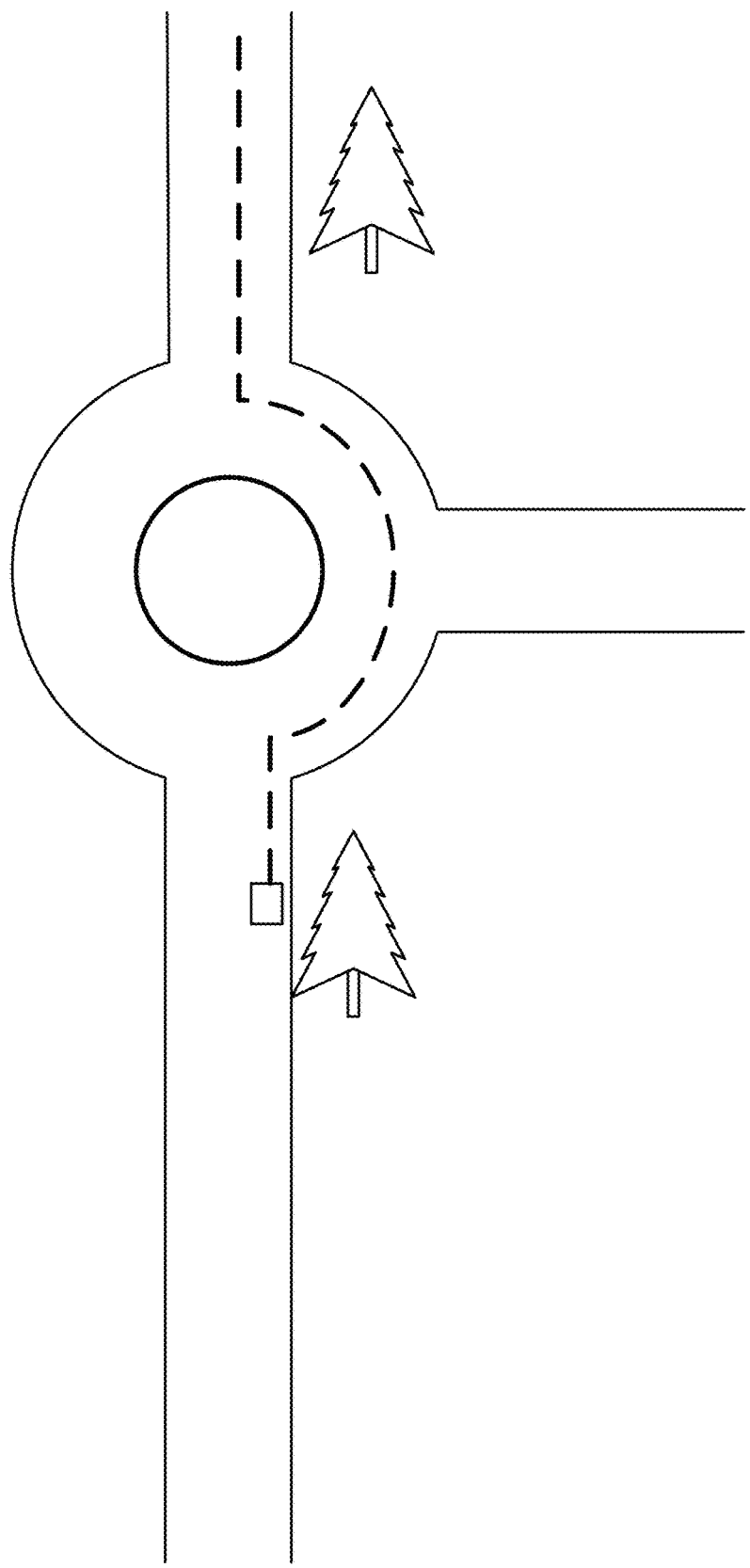
FIG. 4 illustrates a birds eye image of an environment of the motorcycle and a projected path calculated based on a determined radius of a motorcycle turn.

The learning may include
  i. Collecting driving samples of motorcycles—visual/other sensors (e.g. lidar, radar)+related telematics. Or alternatively a set that includes the turning information.
  ii. Including information about the ego motorcycle characteristics (model, wheelbase size, weight etc.)
  iii. Collecting the turn outcome.
  iv. Collecting environmental information (such as road/turn type, weather etc).
  v. Tracking the turning trajectory for each case considering (i) and (ii).
  vi. Generating a geometric representation of the turn for each case) via a vehicle localization (there are multiple mechanisms for localization such as GPS, visual localization etc)
  vii. Generating a clustering of turn telematic conditions (speed, angle, acceleration, starting condition etc)
  viii. If the trajectory is consistent with positive outcome—save this as "positive" cluster, otherwise "dangerous" cluster
  ix. If the trajectory is not consistent—keep breaking down the clusters while adding visual/environmental/characteristic*parameters until the trajectory is consistent
  x. Saving the projected trajectory as metadata for the cluster Once the learning is completed (or at least provide an adequate amount of outputs) the implementation may begin and it may include.
  i. Identifying that the turn is about to start/starting (based on telematics, visual information, or a winker indication)
  ii. Analyzing the telematic information and match it to the relevant cluster, if additional parameters are required (as per 9 in the learning) —obtain additional parameters (visual/environmental/characteristic*parameters) and match them to the relevant cluster.

iii. And obtaining from the matched cluster metadata the projected trajectory.
iv. Displaying—for example using a screen for the driver that shows the projected trajectory marked on the road, so the driver can see where he is going to end up and which way he is going to pass. It can also mark on the trajectory if a certain area of the driving path is non drivable (e.g. there is a stone on the trajectory, going to pass a white line, or going to hit a sidewalk), and alert on potential non successful outcome.
v. The displaying may provide a bird eye view (that can be generated from several cameras) that shows the trajectory from above and an alert of non-successful outcome.
vi. Generating an audio signal or a minimal screen display—for example—alerting about obstacles while turning or turning parameters can bring to a non-successful outcome FIG. 2 is an example of a method 100 for providing a prediction of a radius of a motorcycle turn.

Method 100 may include steps 110, 120, 130 and 140.

Step 110 may include determining that the motorcycle is about to turn. The prediction may be based on sensed information indicating that a path in front of the motorcycle requires the motorcycle to turn (for example reaching a curve in the road or a roundabout), based on a movement of the driver of the motorcycle (starting to turn the wheel, starting to lean sideways, activation of a blinker), based on the drivers history—for example performing turns at similar situations, and the like.

It should be noted that steps 120, 130 and 140 may be executed even when there is no indication to perform the turn.

Step 110 may be followed by step 120 of determining values of multiple radius of turn impacting (RTI) parameters.

It is assumed that the determining included sensing the RTI parameters—and this may be done by using actual sensor and/or virtual sensors. Additionally or alternatively, the determining may include receiving one or more RTI parameter (such as weather condition, street grip) from another computerized entity/network, and the like.

A virtual sensor may process inputs from at least one other sensor.

A sensor may be a visual sensor, an environmental sensor, a radar, a sonar, a LIDAR, a temperature sensor, a humidity sensor, a telemetric sensor, an accelerometer, a speed sensor, an inclination sensor, an active sensor, a passive sensor, a wind sensor, a grip sensor, and any other sensor.

An RTI parameter is a parameter that was found, during a machine learning process, to impact the radius of the turn of the motorcycle—and especially can be used to predict (usually with other RTI parameters the radius.

The RTI parameters may be selected out of many parameters that can be measured by one or more sensors. The selection may include selecting unique RTI parameters and ignoring parameters that their values does not indicate of the radius.

The multiple RTI parameters are selected out of a group of parameters, during a machine learning training process.

The multiple RTI parameters may be selected to provide a desired tradeoff between (a) accuracy of the estimation, and (b) required computational resources and/or memory resources required to determine the radius.

The group of parameters may include motorcycle kinematic parameters, and may include one or more additional parameters.

The machine learning process may include receiving multiple sensed parameter obtained during different motorcycle turning events—and finding unique combinations of sensed parameters per each radius of turn value. The process may include, for example generating clusters and removing cluster points that are not distinctive. The process may include calculating the occurrences of combination of values of sensed parameter and removing combinations that are not unique to certain values of radius of a motorcycle turn.

Step 120 may be followed by step 130 of determining, based on the determined values of the multiple RTI parameters, the estimated radius of the motorcycle turn.

The machine learning process may generate (or may be used to assist in generating) concept structures that are associated with different values of the radius of the motorcycle turn. Each concept structure may be associated with multiple combinations of values of multiple combinations of RTI parameters that once applied result in a certain radius of the radius of the motorcycle turn—or a certain range of values of the radius of the motorcycle turn.

The reference to multiple combinations means that a concept structure may be associated with combinations of different RTI parameters. For example assuming that there are a first number (N1) of RTI parameters. A concept structure may be associated with one or more combinations of values of N1 RTI parameters but may also be associated with one or more combinations of values of less than N1 RTI parameters. The combination of values may be unique combination of values that belong only to a single concept structure.

The values of the multiple combinations of RTI parameters may be represented by one or more RTI parameter signatures. Non-limiting examples of signatures are illustrated, for example, in PCT patent application PCT/IB2019/058207 which is incorporated herein by reference.

Step 130 of determining may include searching for one or more concept structures that match the values of the multiple RTI parameters. Examples for finding matching concept structures are also illustrated in PCT patent application PCT/IB2019/058207 which is incorporated herein by reference.

A concept structure may include radius metadata indicative of the estimated radius of the motorcycle turn associated with the concept structure. Step 130 may be executed in an iterative manner. This is illustrated by steps 131, 132 and 133.

Step 131 include selecting a current sub-set of RTI parameters.

Step 132 includes comparing one or more signature that represent the current sub-set to signatures of the concept structures to find one or more matching concept structures.

When finding only a single matching concept structure—the radius of the motorcycle turn associated with the single matching concept structure is determined (step 133) to be the output of step 130.

When finding two or more matching concept structures—step 132 is followed by step 131 in which a new selection of a current sub-set is made.

The current sub-set of a certain iteration includes at least one RTI parameter not found in a previously selected current sub-set.

Step 130 may be followed by step 140 of performing a driving related operation based on the estimated radius of the motorcycle turn.

It should be noted that at least some of the multiple concept structures may be associated with a safety parameter and the performing of the driving related operation is responsive to the safety parameter.

For example—the safety parameter may indicate whether the radius of the motorcycle turn is considered to be safe and/or even provide a safety grade to driving the motorcycle.

The safety parameter may be learnt during the machine learning process—as the machine learning process may be fed with the outcome of such turns—for example accidents, successful turns and the like. For example—when a certain radius of turn consistently is associated with outcomes of a same safety level then it may be granted that safety level.

Step 140 may include generating an alert when a matching concept structure is tagged as dangerous. This means that the radius of the motorcycle turn related to the matching concept structure is dangerous.

Step 140 may include providing a driver perceivable indication about a projected trajectory of the motorcycle. Thus may include displaying the trajectory (for example over a representation of an environment of the motorcycle, the display may be a holographic display or a non-holographic display, the display may be a part of the motorcycle, the image may be projected on the interior of a helmet worm by the driver), generating an audio indication, transmitting an audio indication to a wearable device of the driver, triggering a tactile alert, and the like.

The projected trajectory of the motorcycle within an environment of the motorcycle may be taken from a bird eye view.

Step 140 may include suggesting the driver to delay the turn or to cancel the turn. For example—if taking the turn will endanger the driver.

If the turn is far enough then step 140 may include suggesting the driver to change the value of at least one RTI parameter ton increase the safety of a future turn.

Various example of generating signatures, processing sensed information and clustering are provided below.

Low Power Generation of Signatures

The analysis of content of a media unit may be executed by generating a signature of the media unit and by comparing the signature to reference signatures. The reference signatures may be arranged in one or more concept structures or may be arranged in any other manner. The signatures may be used for object detection or for any other use.

The signature may be generated by creating a multidimensional representation of the media unit. The multidimensional representation of the media unit may have a very large number of dimensions. The high number of dimensions may guarantee that the multidimensional representation of different media units that include different objects is sparse—and that object identifiers of different objects are distant from each other—thus improving the robustness of the signatures.

The generation of the signature is executed in an iterative manner that includes multiple iterations, each iteration may include an expansion operations that is followed by a merge operation. The expansion operation of an iteration is performed by spanning elements of that iteration. By determining, per iteration, which spanning elements (of that iteration) are relevant—and reducing the power consumption of irrelevant spanning elements—a significant amount of power may be saved.

In many cases, most of the spanning elements of an iteration are irrelevant—thus after determining (by the spanning elements) their relevancy—the spanning elements that are deemed to be irrelevant may be shut down a/or enter an idle mode.

FIG. 1A illustrates a method 5000 for generating a signature of a media unit.

Method 5000 may start by step 5010 of receiving or generating sensed information.

The sensed information may be a media unit of multiple objects.

Step 5010 may be followed by processing the media unit by performing multiple iterations, wherein at least some of the multiple iterations comprises applying, by spanning elements of the iteration, dimension expansion process that are followed by a merge operation.

The processing may include:

Step 5020 of performing a k'th iteration expansion process (k may be a variable that is used to track the number of iterations).

Step 5030 of performing a k'th iteration merge process.

Step 5040 of changing the value of k.

Step 5050 of checking if all required iterations were done—if so proceeding to step 5060 of completing the generation of the signature. Else—jumping to step 5020.

The output of step 5020 is a k'th iteration expansion results 5120.

The output of step 5030 is a k'th iteration merge results 5130.

For each iteration (except the first iteration) —the merge result of the previous iteration is an input to the current iteration expansion process.

At least some of the K iterations involve selectively reducing the power consumption of some spanning elements (during step 5020) that are deemed to be irrelevant.

Figure 1B:
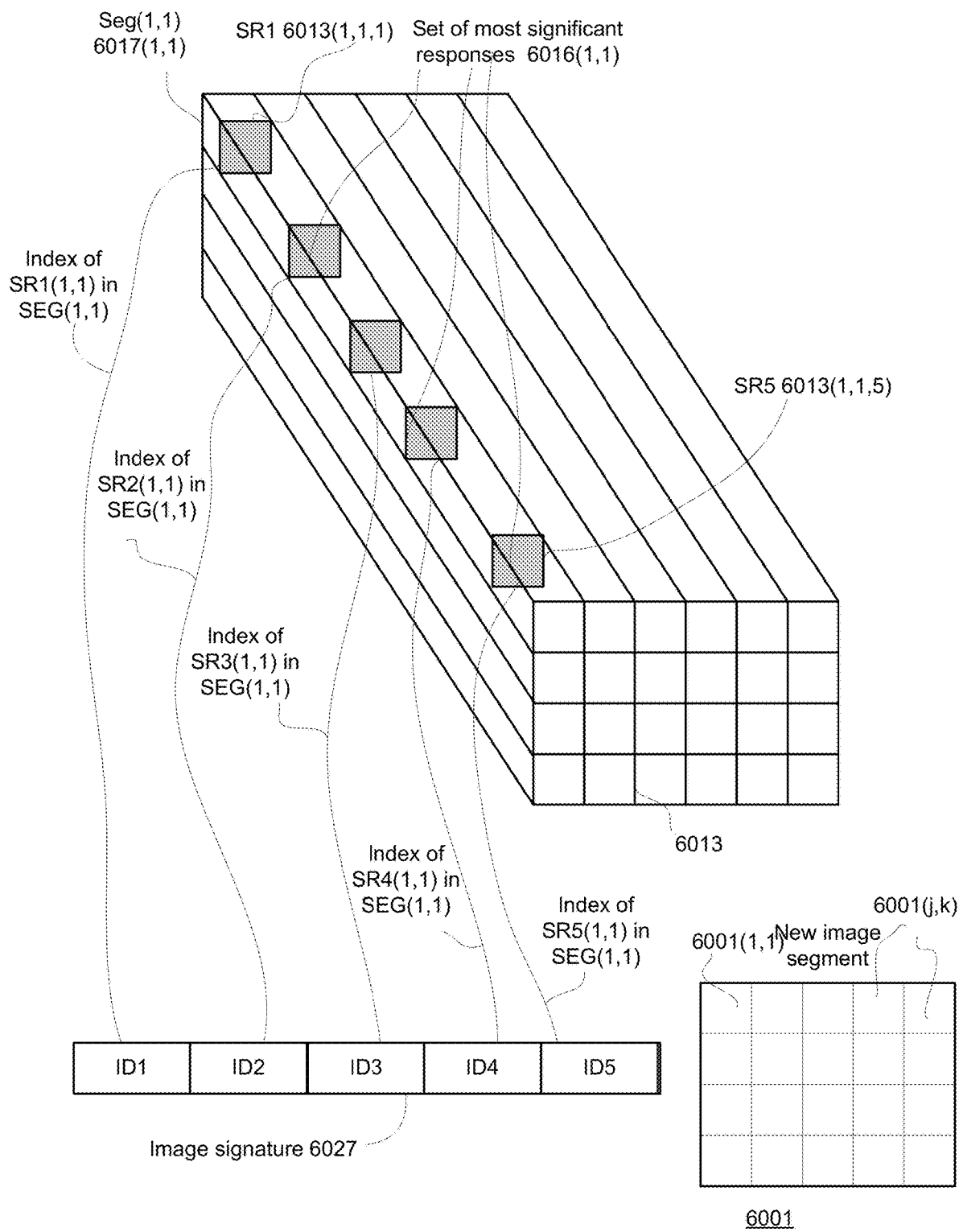
FIG. 1B illustrates an example of a signature.

FIG. 1B is an example of an image signature 6027 of a media unit that is an image 6000 and of an outcome 6013 of the last (K'th) iteration.

The image 6001 is virtually segments to segments 6000 $(i,k)$. The segments may be of the same shape and size but this is not necessarily so.

Outcome 6013 may be a tensor that includes a vector of values per each segment of the media unit. One or more objects may appear in a certain segment. For each object—an object identifier (of the signature) points to locations of significant values, within a certain vector associated with the certain segment.

For example—a top left segment ($6001(1,1)$) of the image may be represented in the outcome 6013 by a vector $V(1,1)$ $6017(1,1)$ that has multiple values. The number of values per vector may exceed 100, 200, 500, 1000, and the like.

The significant values (for example—more than 10, 20, 30, 40 values, and/or more than 0.1%, 0.2%. 0.5%, 1%, 5% of all values of the vector and the like) may be selected. The significant values may have the values—but may be selected in any other manner.

FIG. 1B illustrates a set of significant responses $6015(1,1)$ of vector $V(1,1)$ $6017(1,1)$. The set includes five significant values (such as first significant value $SV1(1,1)$ $6013(1,1,1)$, second significant value $SV2(1,1)$, third significant value $SV3(1,1)$, fourth significant value $SV4(1,1)$, and fifth significant value $SV5(1,1)$ $6013(1,1,5)$.

The image signature 6027 includes five indexes for the retrieval of the five significant values—first till fifth identifiers ID1-ID5 are indexes for retrieving the first till fifth significant values.

Figure 1C:
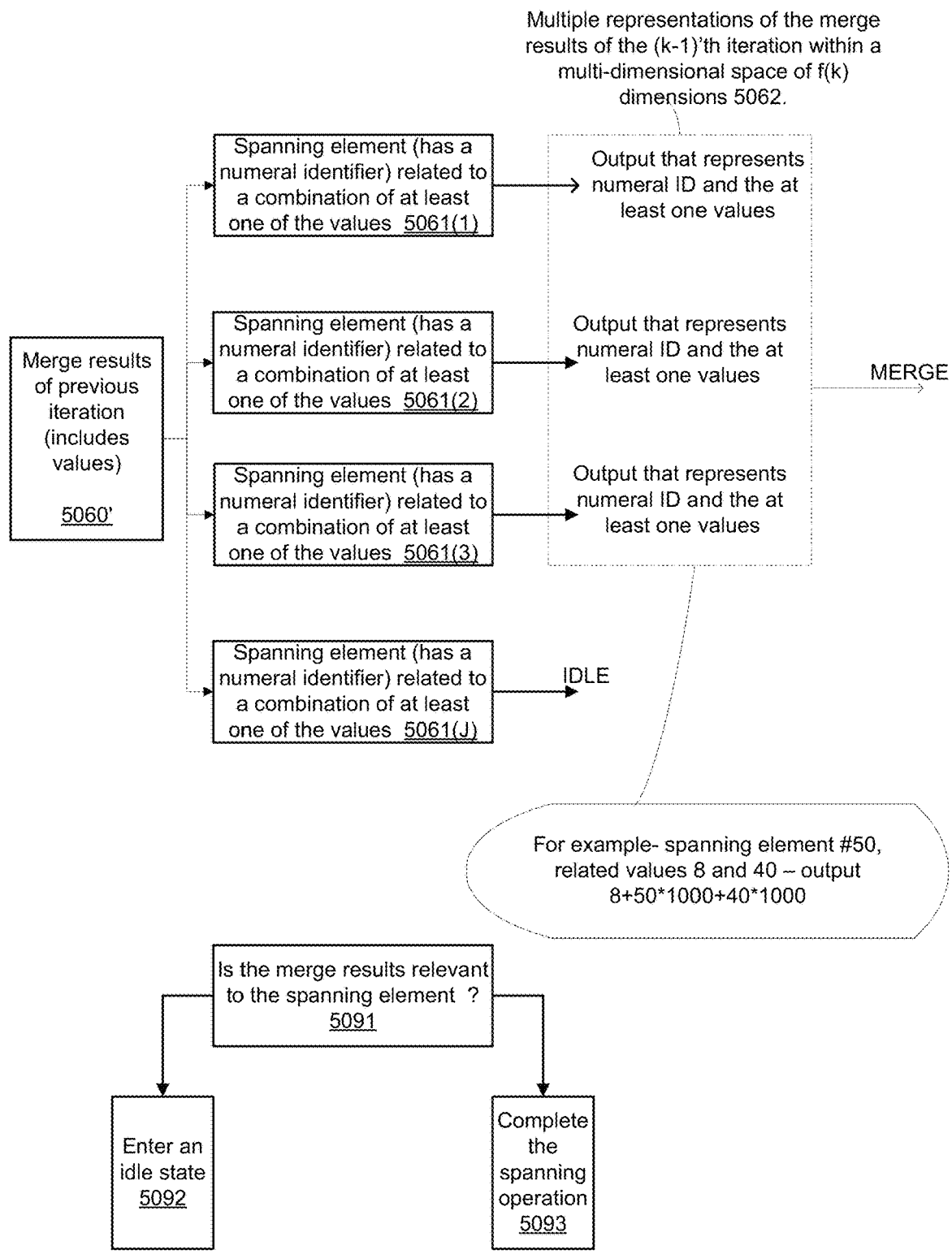
FIG. 1C illustrates an example of a dimension expansion process.

FIG. 1C illustrates a k'th iteration expansion process.

The k'th iteration expansion process start by receiving the merge results 5060' of a previous iteration.

The merge results of a previous iteration may include values are indicative of previous expansion processes—for example—may include values that are indicative of relevant spanning elements from a previous expansion operation, values indicative of relevant regions of interest in a multi-dimensional representation of the merge results of a previous iteration.

The merge results (of the previous iteration) are fed to spanning elements such as spanning elements 5061(1)-5061(J).

Each spanning element is associated with a unique set of values. The set may include one or more values. The spanning elements apply different functions that may be orthogonal to each other. Using non-orthogonal functions may increase the number of spanning elements—but this increment may be tolerable.

The spanning elements may apply functions that are decorrelated to each other—even if not orthogonal to each other.

The spanning elements may be associated with different combinations of object identifiers that may "cover" multiple possible media units. Candidates for combinations of object identifiers may be selected in various manners—for example based on their occurrence in various images (such as test images) randomly, pseudo randomly, according to some rules and the like. Out of these candidates the combinations may be selected to be decorrelated, to cover said multiple possible media units and/or in a manner that certain objects are mapped to the same spanning elements.

Each spanning element compares the values of the merge results to the unique set (associated with the spanning element) and if there is a match—then the spanning element is deemed to be relevant. If so—the spanning element completes the expansion operation.

If there is no match—the spanning element is deemed to be irrelevant and enters a low power mode. The low power mode may also be referred to as an idle mode, a standby mode, and the like. The low power mode is termed low power because the power consumption of an irrelevant spanning element is lower than the power consumption of a relevant spanning element.

In FIG. 1C various spanning elements are relevant (5061(1)-5061(3)) and one spanning element is irrelevant (5061(J)).

Each relevant spanning element may perform a spanning operation that includes assigning an output value that is indicative of an identity of the relevant spanning elements of the iteration. The output value may also be indicative of identities of previous relevant spanning elements (from previous iterations).

For example—assuming that spanning element number fifty is relevant and is associated with a unique set of values of eight and four—then the output value may reflect the numbers fifty, four and eight—for example one thousand multiplied by (fifty+forty) plus forty. Any other mapping function may be applied.

FIG. 1C also illustrates the steps executed by each spanning element:

Checking if the merge results are relevant to the spanning element (step 5091).

If-so—completing the spanning operation (step 5093).

If not—entering an idle state (step 5092).

FIG. 1D is an example of various merge operations.

A merge operation may include finding regions of interest. The regions of interest are regions within a multidimensional representation of the sensed information. A region of interest may exhibit a more significant response (for example a stronger, higher intensity response).

The merge operation (executed during a k'th iteration merge operation) may include at least one of the following:

Step 5031 of searching for overlaps between regions of interest (of the k'th iteration expansion operation results) and define regions of interest that are related to the overlaps.

Step 5032 of determining to drop one or more region of interest, and dropping according to the determination.

Step 5033 of searching for relationships between regions of interest (of the k'th iteration expansion operation results) and define regions of interest that are related to the relationship.

Step 5034 of searching for proximate regions of interest (of the k'th iteration expansion operation results) and define regions of interest that are related to the proximity. Proximate may be a distance that is a certain fraction (for example less than 1%) of the multi-dimensional space, may be a certain fraction of at least one of the regions of interest that are tested for proximity.

Step 5035 of searching for relationships between regions of interest (of the k'th iteration expansion operation results) and define regions of interest that are related to the relationship.

Step 5036 of merging and/or dropping k'th iteration regions of interest based on shape information related to shape of the k'th iteration regions of interest.

The same merge operations may applied in different iterations.

Alternatively, different merge operations may be executed during different iterations.

Figure 1E:
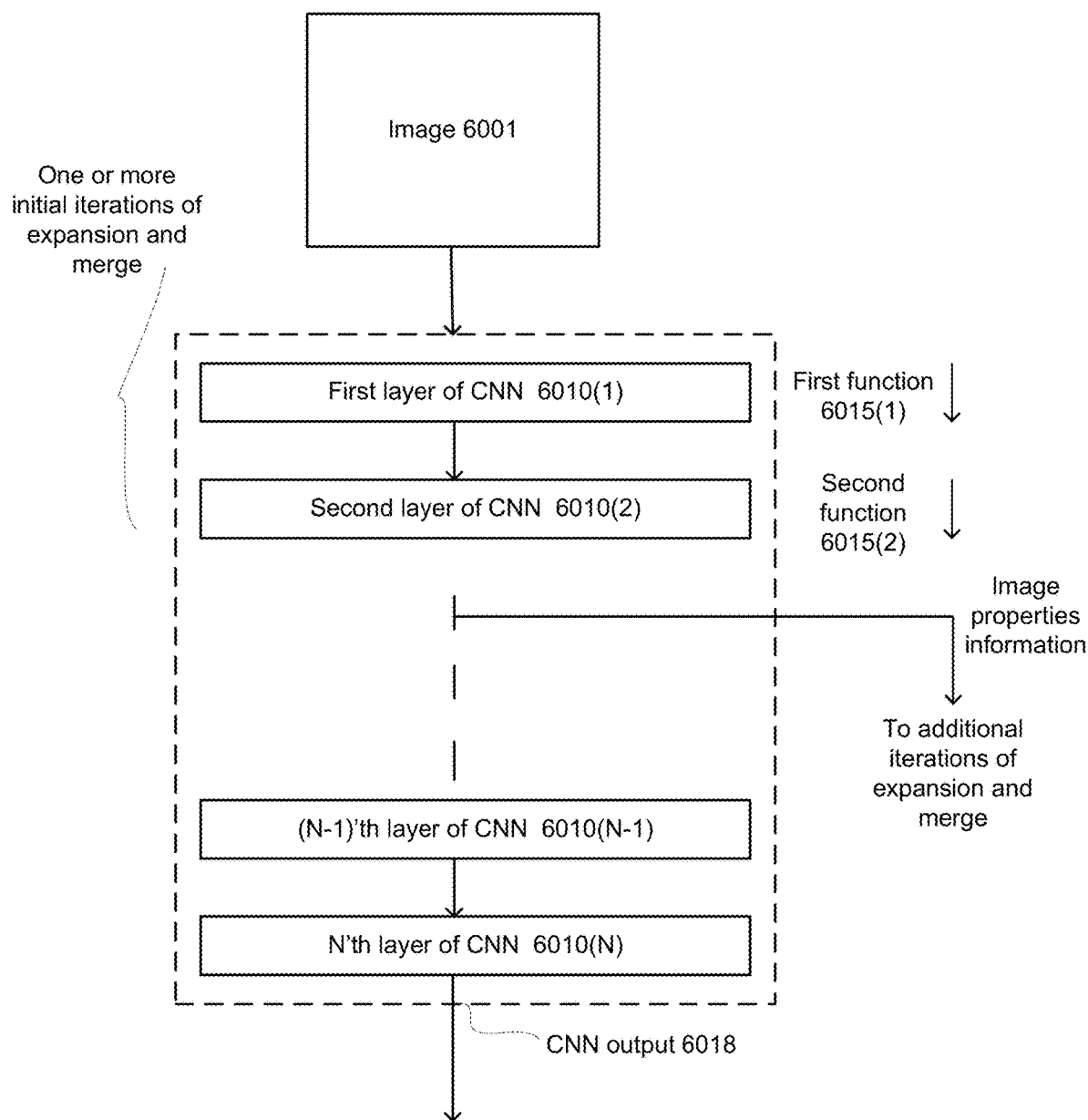
FIG. 1E illustrates an example of hybrid process.

FIG. 1E illustrates an example of a hybrid process and an input image 6001.

The hybrid process is hybrid in the sense that some expansion and merge operations are executed by a convolutional neural network (CNN) and some expansion and merge operations (denoted additional iterations of expansion and merge) are not executed by the CNN—but rather by a process that may include determining a relevancy of spanning elements and entering irrelevant spanning elements to a low power mode.

In FIG. 1E one or more initial iterations are executed by first and second CNN layers 6010(1) and 6010(2) that apply first and second functions 6015(1) and 6015(2).

The output of these layers provided information about image properties. The image properties may not amount to object detection. Image properties may include location of edges, properties of curves, and the like.

The CNN may include additional layers (for example third till N'th layer 6010(N)) that may provide a CNN output 6018 that may include object detection information. It should be noted that the additional layers may not be included.

It should be noted that executing the entire signature generation process by a hardware CNN of fixed connectivity may have a higher power consumption—as the CNN will not be able to reduce the power consumption of irrelevant nodes.

Figure 1F:
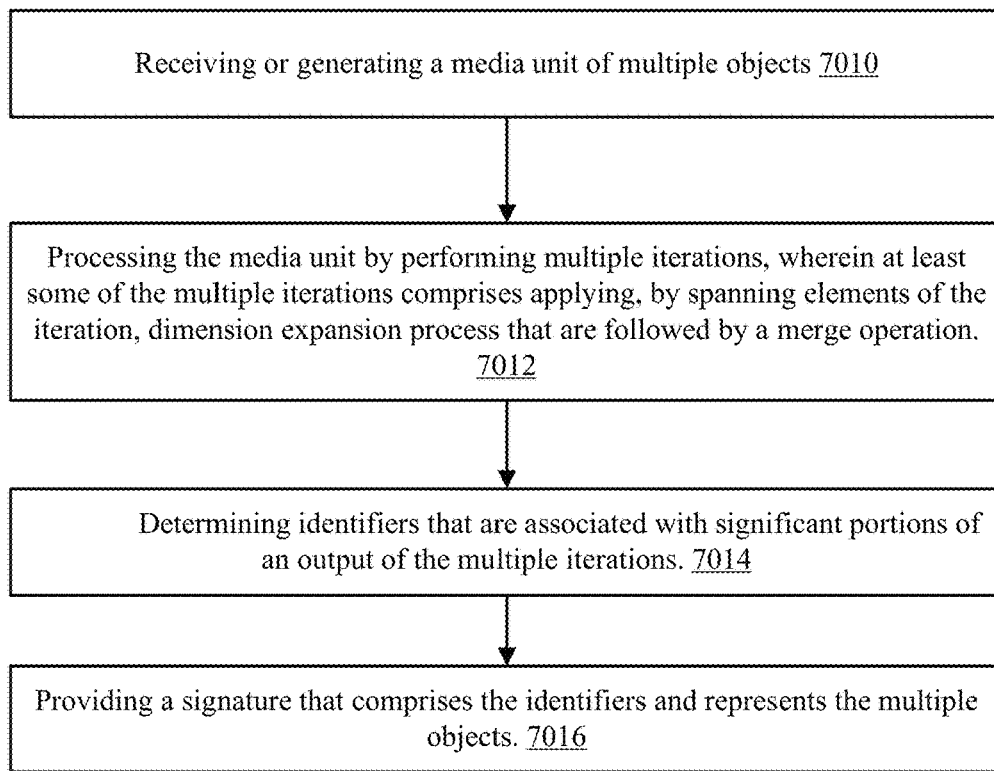
FIG. 1F illustrates an example of a method.

FIG. 1F illustrates a method 7000 for low-power calculation of a signature.

Method 7000 starts by step 7010 of receiving or generating a media unit of multiple objects.

Step 7010 may be followed by step 7012 of processing the media unit by performing multiple iterations, wherein at least some of the multiple iterations comprises applying, by spanning elements of the iteration, dimension expansion process that are followed by a merge operation.

The applying of the dimension expansion process of an iteration may include (a) determining a relevancy of the spanning elements of the iteration; and (b) completing the dimension expansion process by relevant spanning elements of the iteration and reducing a power consumption of irrelevant spanning elements until, at least, a completion of the applying of the dimension expansion process.

The identifiers may be retrieval information for retrieving the significant portions.

The at least some of the multiple iterations may be a majority of the multiple iterations.

The output of the multiple iteration may include multiple property attributes for each segment out of multiple segments of the media unit; and wherein the significant portions of an output of the multiple iterations may include more impactful property attributes.

The first iteration of the multiple iteration may include applying the dimension expansion process by applying different filters on the media unit.

The at least some of the multiple iteration exclude at least a first iteration of the multiple iterations. See, for example, FIG. 1E.

The determining the relevancy of the spanning elements of the iteration may be based on at least some identities of relevant spanning elements of at least one previous iteration.

The determining the relevancy of the spanning elements of the iteration may be based on at least some identities of relevant spanning elements of at least one previous iteration that preceded the iteration.

The determining the relevancy of the spanning elements of the iteration may be based on properties of the media unit.

The determining the relevancy of the spanning elements of the iteration may be performed by the spanning elements of the iteration.

Method 7000 may include a neural network processing operation that may be executed by one or more layers of a neural network and does not belong to the at least some of the multiple iterations. See, for example, FIG. 1E.

The at least one iteration may be executed without reducing power consumption of irrelevant neurons of the one or more layers.

The one or more layers may output information about properties of the media unit, wherein the information differs from a recognition of the multiple objects.

The applying, by spanning elements of an iteration that differs from the first iteration, the dimension expansion process may include assigning output values that may be indicative of an identity of the relevant spanning elements of the iteration. See, for example, FIG. 1C.

The applying, by spanning elements of an iteration that differs from the first iteration, the dimension expansion process may include assigning output values that may be indicative a history of dimension expansion processes until the iteration that differs from the first iteration.

The each spanning element may be associated with a subset of reference identifiers. The determining of the relevancy of each spanning elements of the iteration may be based a relationship between the subset of the reference identifiers of the spanning element and an output of a last merge operation before the iteration.

The output of a dimension expansion process of an iteration may be a multidimensional representation of the media unit that may include media unit regions of interest that may be associated with one or more expansion processes that generated the regions of interest.

The merge operation of the iteration may include selecting a subgroup of media unit regions of interest based on a spatial relationship between the subgroup of multidimensional regions of interest.

Method 7000 may include applying a merge function on the subgroup of multidimensional regions of interest. See, for example, FIG. 1C.

Method 7000 may include applying an intersection function on the subgroup of multidimensional regions of interest. See, for example, FIG. 1C.

The merge operation of the iteration may be based on an actual size of one or more multidimensional regions of interest.

The merge operation of the iteration may be based on relationship between sizes of the multidimensional regions of interest. For example—larger multidimensional regions of interest may be maintained while smaller multidimensional regions of interest may be ignored of.

The merge operation of the iteration may be based on changes of the media unit regions of interest during at least the iteration and one or more previous iteration.

Step 7012 may be followed by step 7014 of determining identifiers that are associated with significant portions of an output of the multiple iterations.

Step 7014 may be followed by step 7016 of providing a signature that comprises the identifiers and represents the multiple objects.

Localization and Segmentation

Any of the mentioned above signature generation method provides a signature that does not explicitly includes accurate shape information. This adds to the robustness of the signature to shape related inaccuracies or to other shape related parameters.

The signature includes identifiers for identifying media regions of interest.

Each media region of interest may represent an object (for example a vehicle, a pedestrian, a road element, a human made structure, wearables, shoes, a natural element such as a tree, the sky, the sun, and the like) or a part of an object (for example—in the case of the pedestrian—a neck, a head, an arm, a leg, a thigh, a hip, a foot, an upper arm, a forearm, a wrist, and a hand). It should be noted that for object detection purposes a part of an object may be regarded as an object.

The exact shape of the object may be of interest.

Figure 1G:
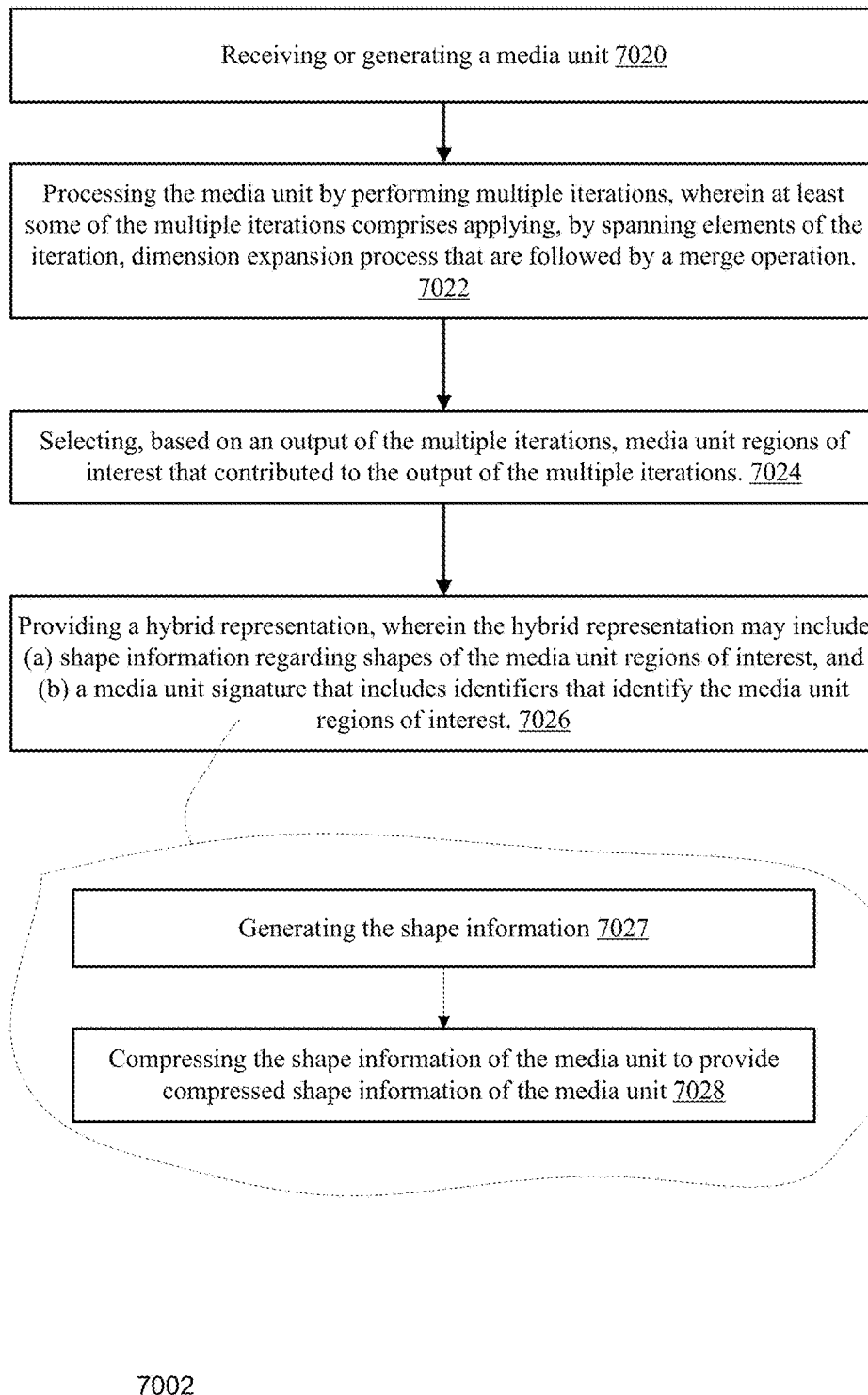
FIG. 1G illustrates an example of a method.

FIG. 1G illustrates method 7002 of generating a hybrid representation of a media unit.

Method 7002 may include a sequence of steps 7020, 7022, 7024 and 7026.

Step 7020 may include receiving or generating the media unit.

Step 7022 may include processing the media unit by performing multiple iterations, wherein at least some of the multiple iterations comprises applying, by spanning elements of the iteration, dimension expansion process that are followed by a merge operation.

Step 7024 may include selecting, based on an output of the multiple iterations, media unit regions of interest that contributed to the output of the multiple iterations.

Step 7026 may include providing a hybrid representation, wherein the hybrid representation may include (a) shape information regarding shapes of the media unit regions of interest, and (b) a media unit signature that includes identifiers that identify the media unit regions of interest.

Step 7024 may include selecting the media regions of interest per segment out of multiple segments of the media unit. See, for example, FIG. 2.

Step 7026 may include step 7027 of generating the shape information.

The shape information may include polygons that represent shapes that substantially bound the media unit regions of interest. These polygons may be of a high degree.

In order to save storage space, the method may include step 7028 of compressing the shape information of the media unit to provide compressed shape information of the media unit.

Figure 1H:
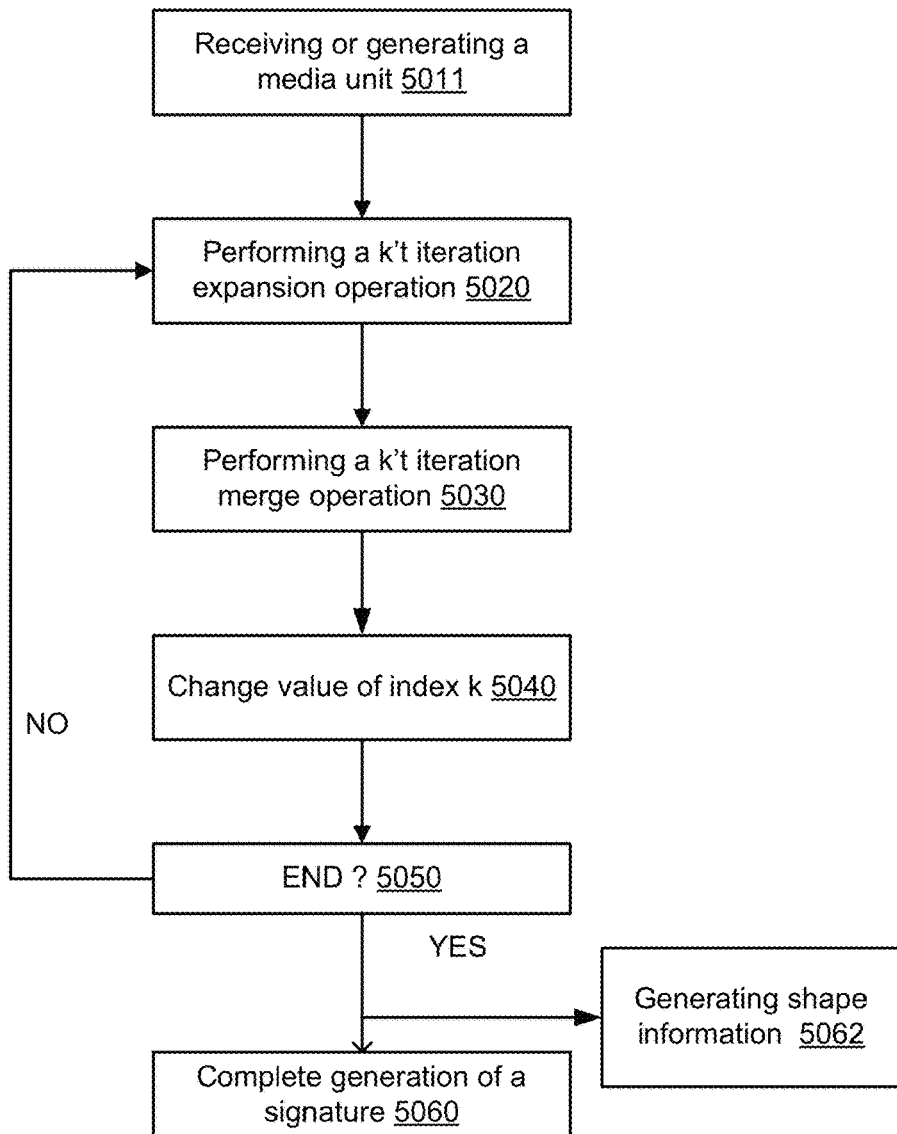
FIG. 1H illustrates an example of a method.

FIG. 1H illustrates method 5002 for generating a hybrid representation of a media unit.

Method 5002 may start by step 5011 of receiving or generating a media unit.

Step 5011 may be followed by processing the media unit by performing multiple iterations, wherein at least some of the multiple iterations comprises applying, by spanning elements of the iteration, dimension expansion process that are followed by a merge operation.

The processing may be followed by steps 5060 and 5062.

The processing may include steps 5020, 5030, 5040 and 5050.

Step 5020 may include performing a k'th iteration expansion process (k may be a variable that is used to track the number of iterations).

Step 5030 may include performing a k'th iteration merge process.

Step 5040 may include changing the value of k.

Step 5050 may include checking if all required iterations were done—if so proceeding to steps 5060 and 5062. Else—jumping to step 5020.

The output of step 5020 is a k'th iteration expansion result.

The output of step 5030 is a k'th iteration merge result.

For each iteration (except the first iteration) —the merge result of the previous iteration is an input to the current iteration expansion process.

Step 5060 may include completing the generation of the signature.

Step 5062 may include generating shape information regarding shapes of media unit regions of interest. The signature and the shape information provide a hybrid representation of the media unit.

The combination of steps 5060 and 5062 amounts to a providing a hybrid representation, wherein the hybrid representation may include (a) shape information regarding shapes of the media unit regions of interest, and (b) a media unit signature that includes identifiers that identify the media unit regions of interest.

Object detection using compressed shape information.

Object detection may include comparing a signature of an input image to signatures of one or more cluster structures in order to find one or more cluster structures that include one or more matching signatures that match the signature of the input image.

The number of input images that are compared to the cluster structures may well exceed the number of signatures of the cluster structures. For example—thousands, tens of thousands, hundreds of thousands (and even more) of input signature may be compared to much less cluster structure signatures. The ratio between the number of input images to the aggregate number of signatures of all the cluster structures may exceed ten, one hundred, one thousand, and the like.

In order to save computational resources, the shape information of the input images may be compressed.

On the other hand—the shape information of signatures that belong to the cluster structures may be uncompressed—and of higher accuracy than those of the compressed shape information.

When the higher quality is not required—the shape information of the cluster signature may also be compressed.

Compression of the shape information of cluster signatures may be based on a priority of the cluster signature, a popularity of matches to the cluster signatures, and the like.

The shape information related to an input image that matches one or more of the cluster structures may be calculated based on shape information related to matching signatures.

For example—a shape information regarding a certain identifier within the signature of the input image may be determined based on shape information related to the certain identifiers within the matching signatures.

Any operation on the shape information related to the certain identifiers within the matching signatures may be applied in order to determine the (higher accuracy) shape information of a region of interest of the input image identified by the certain identifier.

For example—the shapes may be virtually overlaid on each other and the population per pixel may define the shape.

For example—only pixels that appear in at least a majority of the overlaid shaped should be regarded as belonging to the region of interest.

Other operations may include smoothing the overlaid shapes, selecting pixels that appear in all overlaid shapes.

The compressed shape information may be ignored of or be taken into account.

Figure 1I:
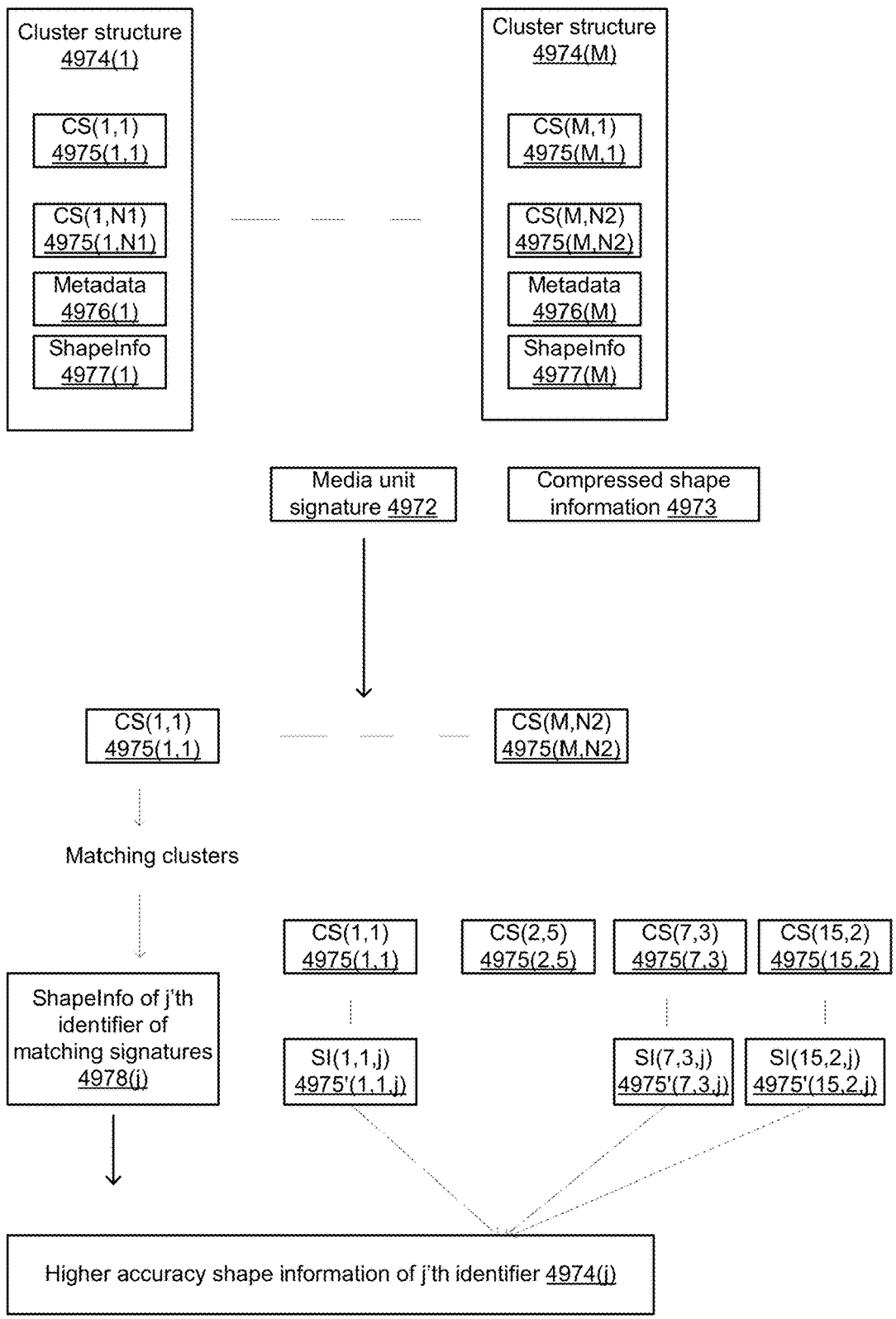
FIG. 1I illustrates an example of a method.

FIG. 1I illustrates a matching process and a generation of a higher accuracy shape information.

It is assumed that there are multiple (M) cluster structures 4974(1)-4974(M). Each cluster structure includes cluster signatures, metadata regarding the cluster signatures, and shape information regarding the regions of interest identified by identifiers of the cluster signatures.

For example—first cluster structure 4974(1) includes multiple (N1) signatures (referred to as cluster signatures CS) CS(1,1)-CS(1,N1) 4975(1,1)-4975(1,N1), metadata 4976(1), and shape information (Shapeinfo 4977(1)) regarding shapes of regions of interest associated with identifiers of the CSs.

Yet for another example—M'th cluster structure 4974(M) includes multiple (N2) signatures (referred to as cluster signatures CS) CS(M,1)-CS(M,N2) 4975(M,1)-4975(M, N2), metadata 4976(M), and shape information (Shapeinfo 4977(M)) regarding shapes of regions of interest associated with identifiers of the CSs.

The number of signatures per concept structure may change over time—for example due to cluster reduction attempts during which a CS is removed from the structure to provide a reduced cluster structure, the reduced structure is checked to determine that the reduced cluster signature may still identify objects that were associated with the (non-reduced) cluster signature—and if so the signature may be reduced from the cluster signature.

The signatures of each cluster structures are associated to each other, wherein the association may be based on similarity of signatures and/or based on association between metadata of the signatures.

Assuming that each cluster structure is associated with a unique object—then objects of a media unit may be identified by finding cluster structures that are associated with said objects. The finding of the matching cluster structures may include comparing a signature of the media unit to signatures of the cluster structures- and searching for one or more matching signature out of the cluster signatures.

In FIG. 1I—a media unit having a hybrid representation undergoes object detection. The hybrid representation includes media unit signature 4972 and compressed shape information 4973.

The media unit signature 4972 is compared to the signatures of the M cluster structures—from CS(1,1) 4975(1,1) till CS(M,N2) 4975(M,N2).

We assume that one or more cluster structures are matching cluster structures.

Once the matching cluster structures are found the method proceeds by generating shape information that is of higher accuracy then the compressed shape information.

The generation of the shape information is done per identifier.

For each j that ranges between 1 and J (J is the number of identifiers per the media unit signature 4972) the method may perform the steps of:

Find (step 4978(j)) the shape information of the j'th identifier of each matching signature- or of each signature of the matching cluster structure.

Generate (step 4979(j)) a higher accuracy shape information of the j'th identifier.

For example—assuming that the matching signatures include CS(1,1) 2975(1,1), CS(2,5) 2975(2,5), CS(7,3) 2975(7,3) and CS(15,2) 2975(15,2), and that the j'th identifier is included in CS(1,1) 2975(1,1), CS(7,3) 2975(7,3) and CS(15,2) 2975(15,2) —then the shape information of the j'th identifier of the media unit is determined based on the shape information associated with CS(1,1) 2975(1,1), CS(7,3) 2975(7,3) and CS(15,2) 2975(15,2).

Figure 1J:
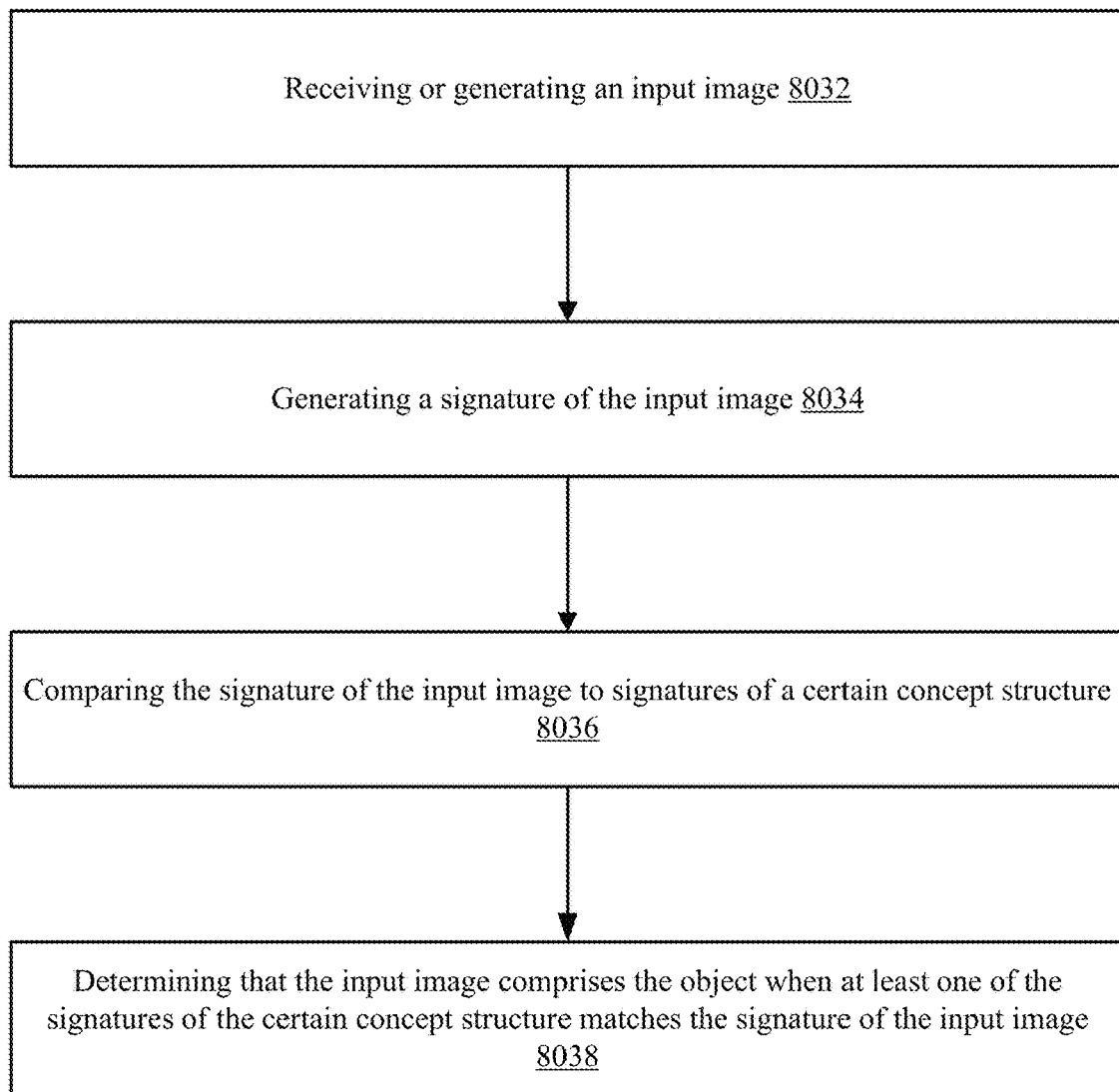
FIG. 1J illustrates an example of a method.
Figure 1K:
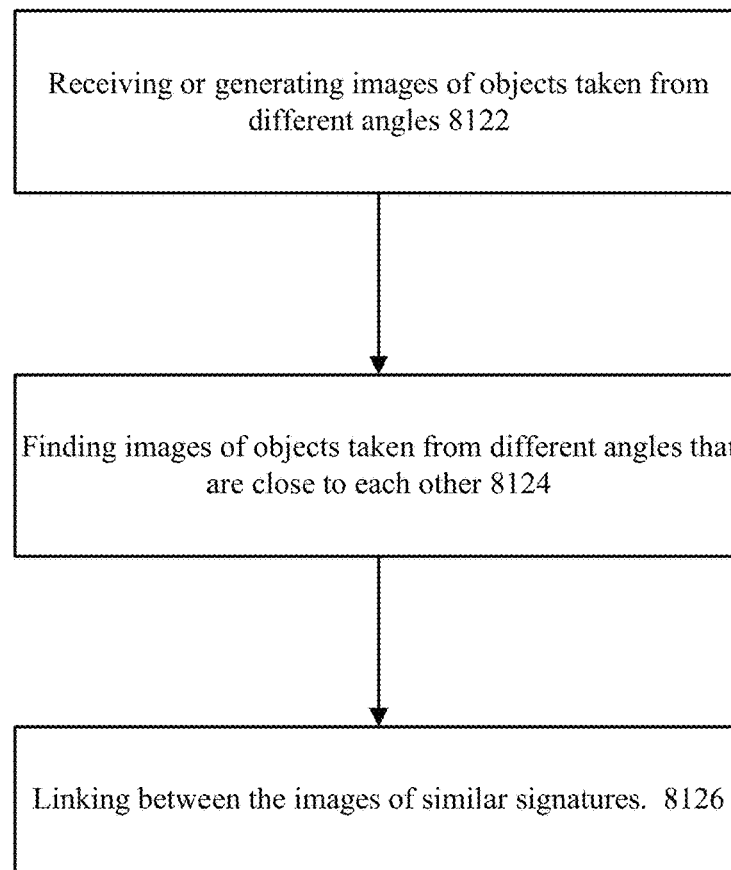
FIG. 1K illustrates an example of a method.
Figure 1L:
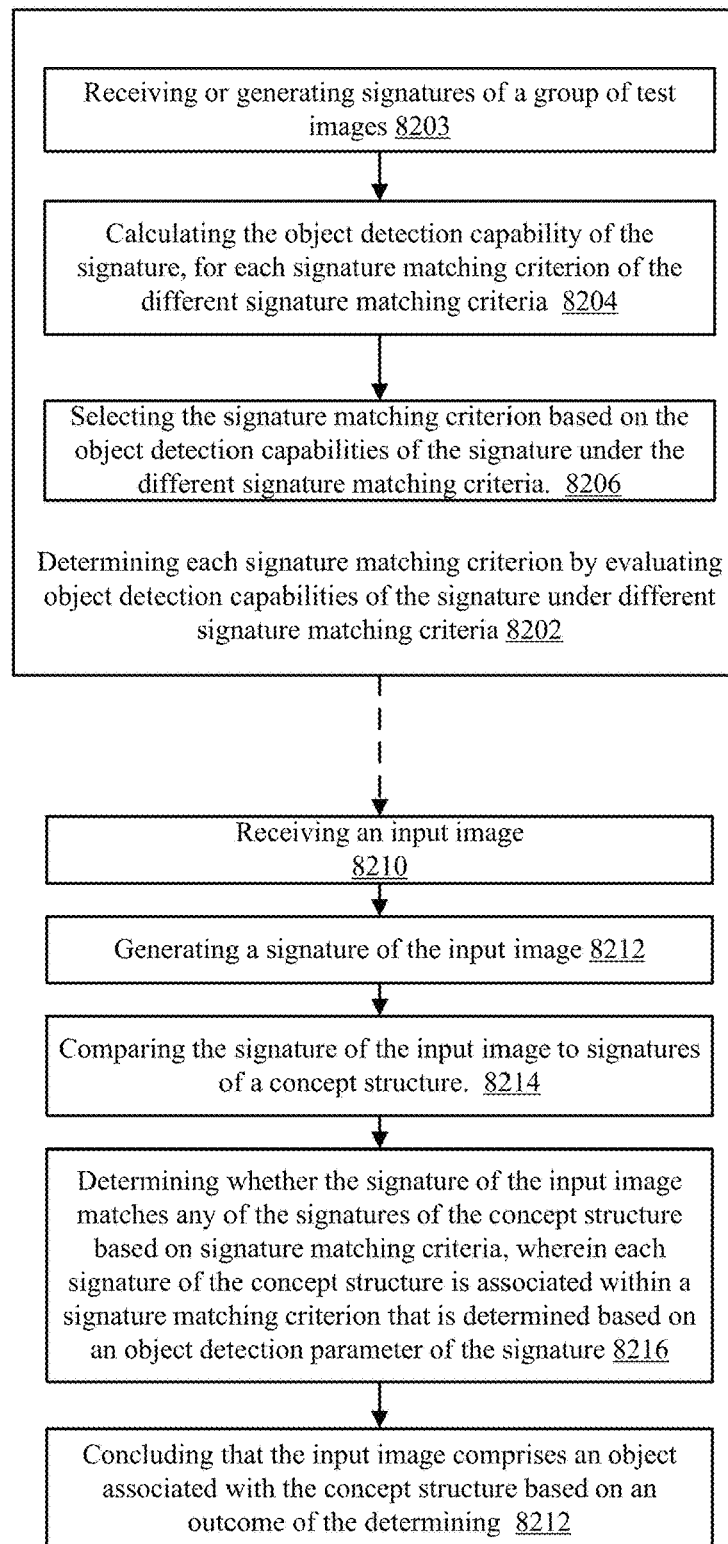
FIG. 1L illustrates an example of a method.
Figure 1M:
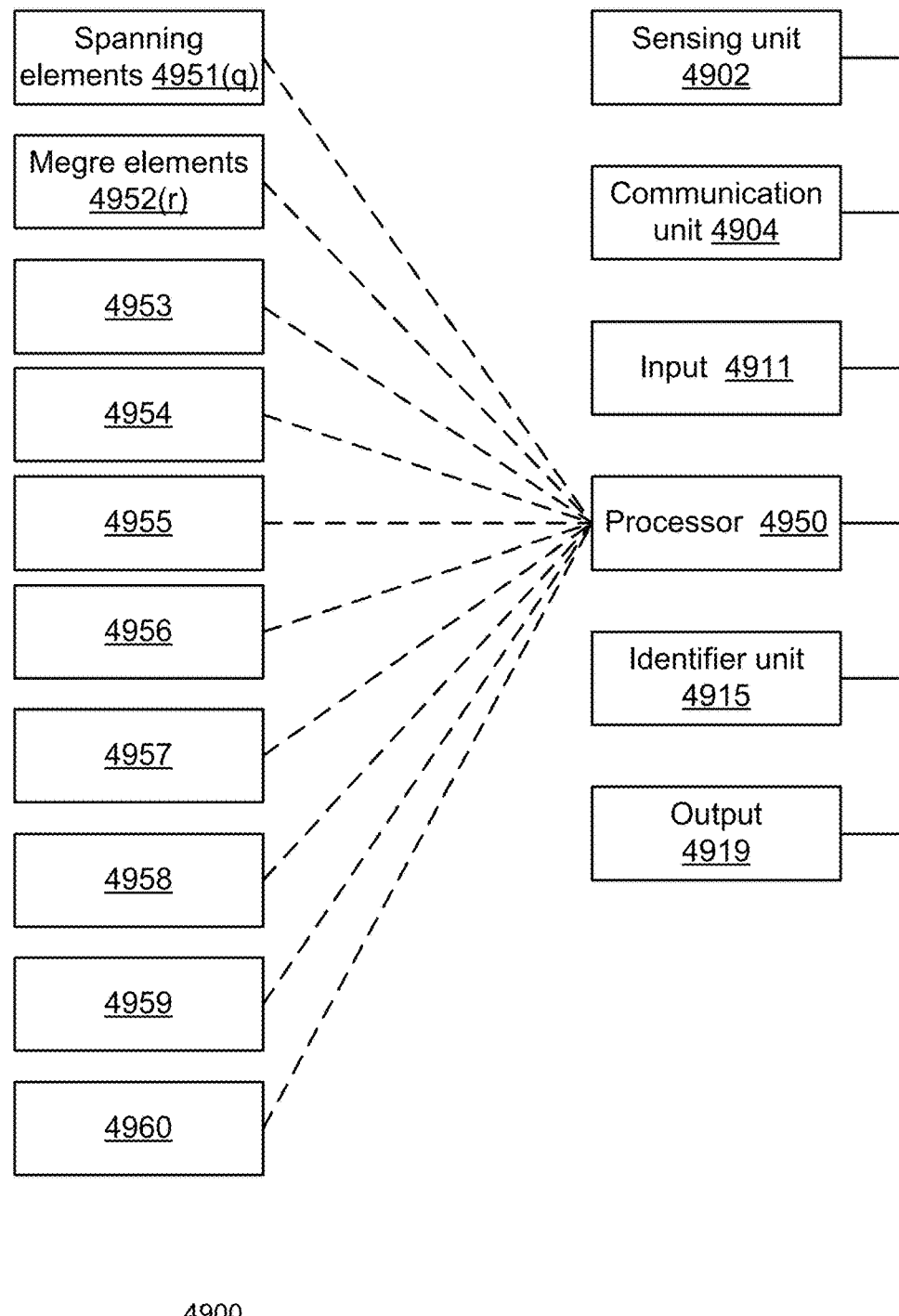
FIG. 1M illustrates an example of a system.
Figure 1N:
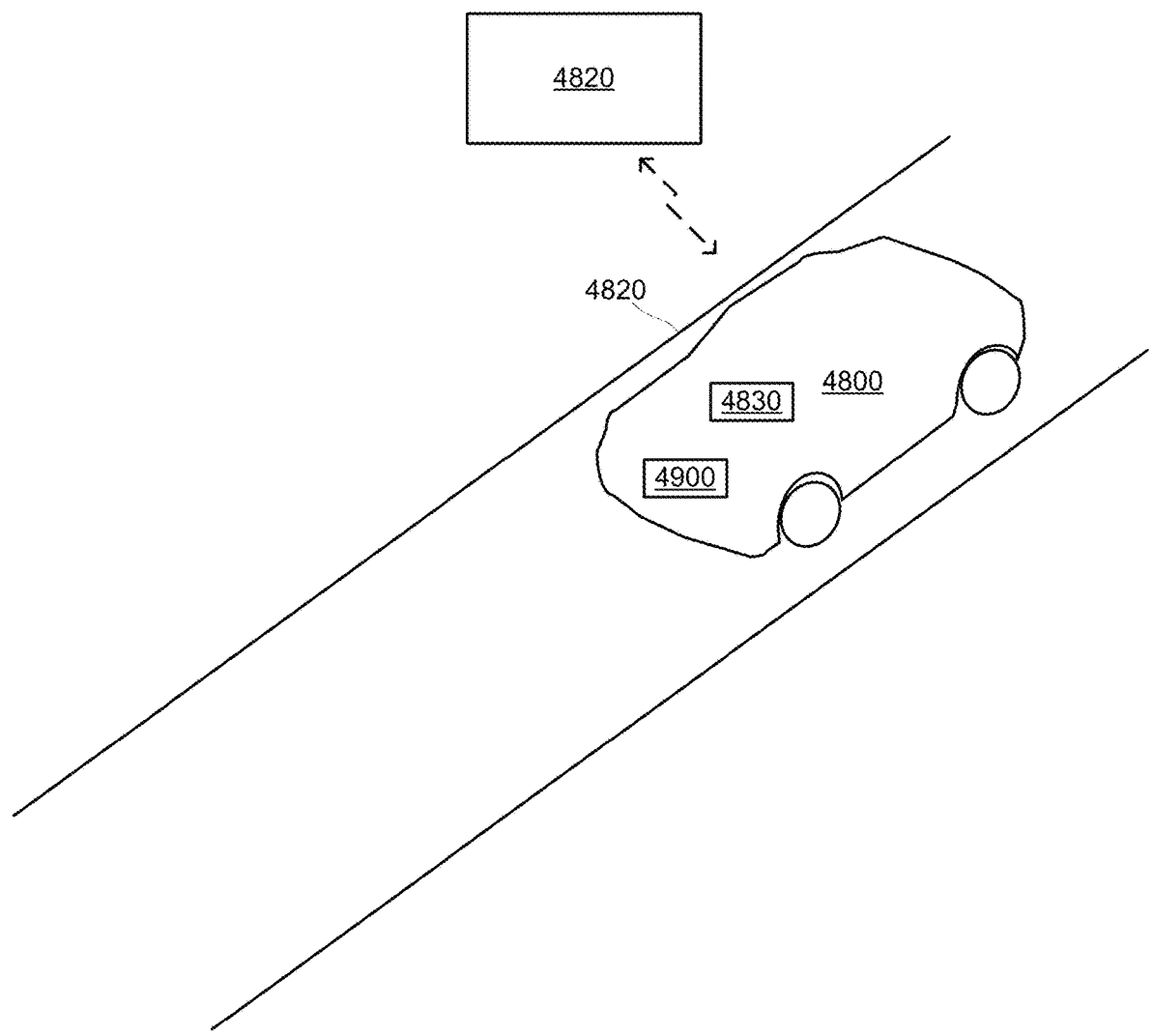
FIG. 1N is a partly-pictorial, partly-block diagram illustration of an exemplary obstacle detection and mapping system, constructed and operative in accordance with embodiments described herein.
Figure 10:
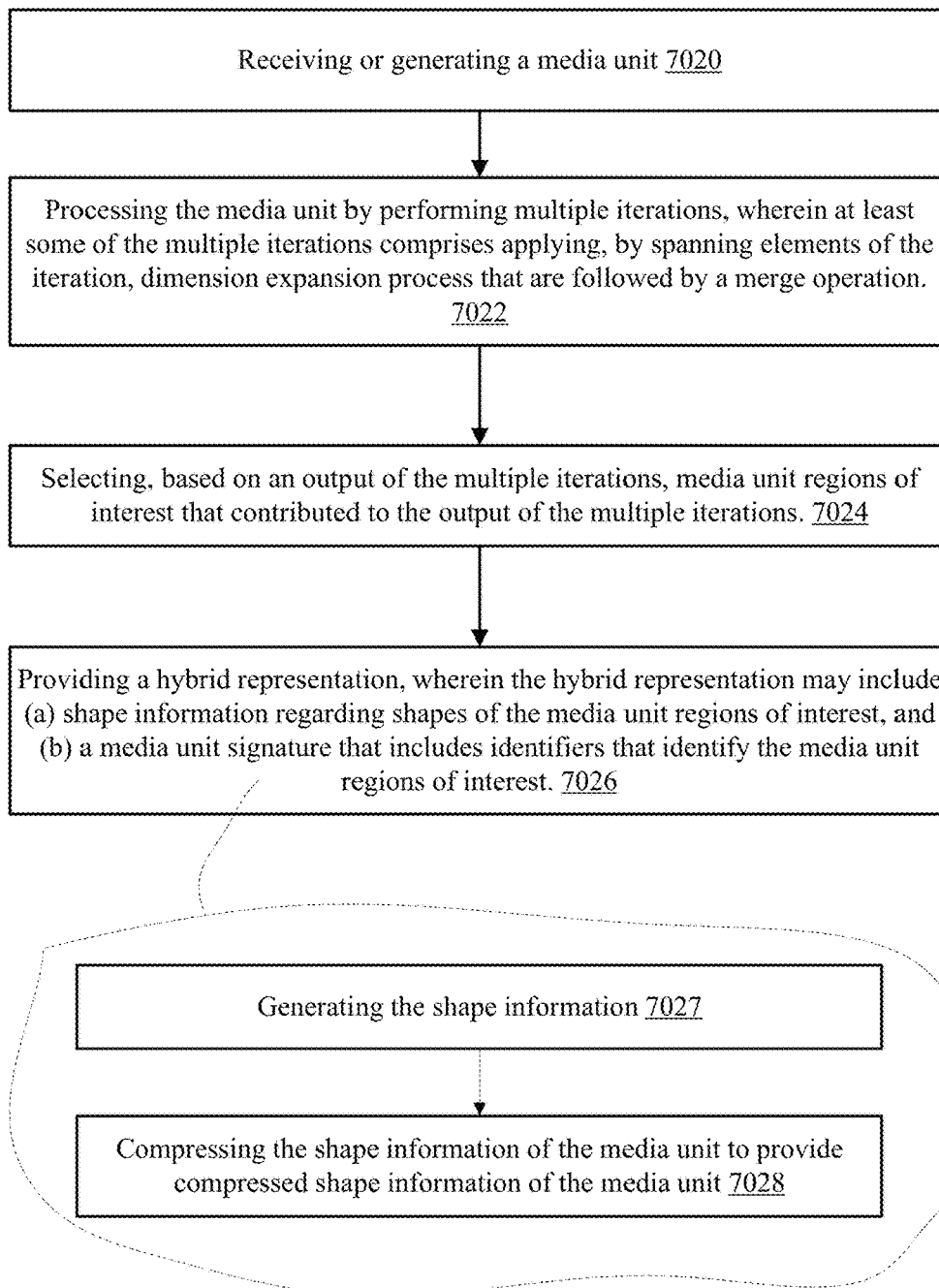
Figure 1P:
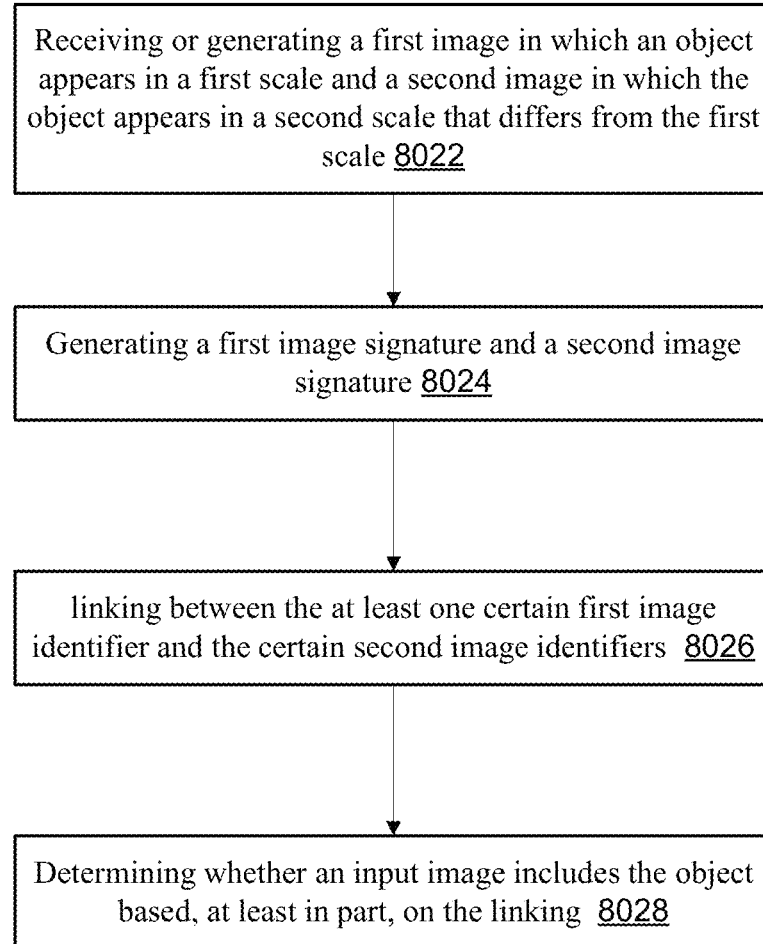
FIG. 1P illustrates an example of a method.

FIG. 1P illustrates an image 8000 that includes four regions of interest 8001, 8002, 8003 and 8004. The signature 8010 of image 8000 includes various identifiers including ID1 8011, ID2 8012, ID3 8013 and ID4 8014 that identify the four regions of interest 8001, 8002, 8003 and 8004.

The shapes of the four regions of interest 8001, 8002, 8003 and 8004 are four polygons. Accurate shape information regarding the shapes of these regions of interest may be generated during the generation of signature 8010.

FIG. 1J illustrates method 8030 for object detection.

Method 8030 may include the steps of method 8020 or may be preceded by steps 8022, 8024 and 8026.

Method 8030 may include a sequence of steps 8032, 8034, 8036 and 8038.

Step 8032 may include receiving or generating an input image.

Step 8034 may include generating a signature of the input image.

Step 8036 may include comparing the signature of the input image to signatures of a certain concept structure. The certain concept structure may be generated by method 8020.

Step 8038 may include determining that the input image comprises the object when at least one of the signatures of the certain concept structure matches the signature of the input image.

FIG. 2D illustrates method 8040 for object detection.

Method 8040 may include the steps of method 8020 or may be preceded by steps 8022, 8024 and 8026.

Method 8040 may include a sequence of steps 8041, 8043, 8045, 8047 and 8049.

Step 8041 may include receiving or generating an input image.

Step 8043 may include generating a signature of the input image, the signature of the input image comprises only some of the certain second image identifiers; wherein the input image of the second scale.

Step 8045 may include changing a scale of the input image to the first scale to a provide an amended input image.

Step 8047 may include generating a signature of the amended input image.

Step 8049 may include verifying that the input image comprises the object when the signature of the amended input image comprises the at least one certain first image identifier.

Object detection that is robust to angle of acquisition.

Object detection may benefit from being robust to the angle of acquisition—to the angle between the optical axis of an image sensor and a certain part of the object. This allows the detection process to be more reliable, use fewer different clusters (may not require multiple clusters for identifying the same object from different images).

FIG. 1K illustrates method 8120 that includes the following steps:

Step 8122 of receiving or generating images of objects taken from different angles.

Step 8124 of finding images of objects taken from different angles that are close to each other. Close enough may be less than 1, 5, 10, 15 and 20 degrees—but the closeness may be better reflected by the reception of substantially the same signature.

Step 8126 of linking between the images of similar signatures. This may include searching for local similarities. The similarities are local in the sense that they are calculated per a subset of signatures. For example—assuming that the similarity is determined per two images—then a first signature may be linked to a second signature that is similar to the first image. A third signature may be linked to the second image based on the similarity between the second and third signatures- and even regardless of the relationship between the first and third signatures.

Step 8126 may include generating a concept data structure that includes the similar signatures.

This so-called local or sliding window approach, in addition to the acquisition of enough images (that will statistically provide a large angular coverage) will enable to generate a concept structure that include signatures of an object taken at multiple directions.

Signature Tailored Matching Threshold.

Object detection may be implemented by (a) receiving or generating concept structures that include signatures of media units and related metadata, (b) receiving a new media unit, generating a new media unit signature, and (c) comparing the new media unit signature to the concept signatures of the concept structures.

The comparison may include comparing new media unit signature identifiers (identifiers of objects that appear in the new media unit) to concept signature identifiers and determining, based on a signature matching criteria whether the new media unit signature matches a concept signature. If such a match is found then the new media unit is regarded as including the object associated with that concept structure.

It was found that by applying an adjustable signature matching criteria, the matching process may be highly effective and may adapt itself to the statistics of appearance of identifiers in different scenarios. For example—a match may be obtained when a relatively rear but highly distinguishing identifier appears in the new media unit signature and in a cluster signature, but a mismatch may be declared when multiple common and slightly distinguishing identifiers appear in the new media unit signature and in a cluster signature.

FIG. 1L illustrates method 8200 for object detection.

Method 8200 may include:

Step 8210 of receiving an input image.

Step 8212 of generating a signature of the input image.

Step 8214 of comparing the signature of the input image to signatures of a concept structure.

Step 8216 of determining whether the signature of the input image matches any of the signatures of the concept structure based on signature matching criteria, wherein each signature of the concept structure is associated within a signature matching criterion that is determined based on an object detection parameter of the signature.

Step 8218 of concluding that the input image comprises an object associated with the concept structure based on an outcome of the determining.

The signature matching criteria may be a minimal number of matching identifiers that indicate of a match. For example—assuming a signature that include few tens of identifiers, the minimal number may vary between a single identifier to all of the identifiers of the signature.

It should be noted that an input image may include multiple objects and that a signature of the input image may match multiple cluster structures. Method 8200 is applicable to all of the matching processes- and that the signature matching criteria may be set for each signature of each cluster structure.

Step 8210 may be preceded by step 8202 of determining each signature matching criterion by evaluating object detection capabilities of the signature under different signature matching criteria.

Step 8202 may include:

Step 8203 of receiving or generating signatures of a group of test images.

Step 8204 of calculating the object detection capability of the signature, for each signature matching criterion of the different signature matching criteria.

Step 8206 of selecting the signature matching criterion based on the object detection capabilities of the signature under the different signature matching criteria.

The object detection capability may reflect a percent of signatures of the group of test images that match the signature.

The selecting of the signature matching criterion comprises selecting the signature matching criterion that once applied results in a percent of signatures of the group of test images that match the signature that is closets to a predefined desired percent of signatures of the group of test images that match the signature.

The object detection capability may reflect a significant change in the percent of signatures of the group of test images that match the signature. For example—assuming, that the signature matching criteria is a minimal number of matching identifiers and that changing the value of the minimal numbers may change the percentage of matching test images. A substantial change in the percentage (for example a change of more than 10, 20, 30, 40 percent) may be indicative of the desired value. The desired value may be set before the substantial change, proximate to the substantial change, and the like.

For example, referring to FIG. 1I, cluster signatures CS(1,1), CS(2,5), CS(7,3) and CS(15,2) match unit signature 4972. Each of these matches may apply a unique signature matching criterion.

Examples of Systems

FIG. 1M illustrates an example of a system capable of executing one or more of the mentioned above methods.

The system include various components, elements and/or units.

A component element and/or unit may be a processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Alternatively, each component element and/or unit may implemented in hardware, firmware, or software that may be executed by a processing circuitry.

System 4900 may include sensing unit 4902, communication unit 4904, input 4911, one or more processors—such as processor 4950, and output 4919. The communication unit 4904 may include the input and/or the output. The communication unit 4904 may communicate with any entity—within the vehicle (for example driver device, passenger device, multimedia device), outside the vehicle (another vehicle, another computerized system—such as out-of-vehicle computerized system 4820 of FIG. 1N, another road user, another human outside the vehicle), and the like.

Input and/or output may be any suitable communications component such as a network interface card, universal serial bus (USB) port, disk reader, modem or transceiver that may be operative to use protocols such as are known in the art to communicate either directly, or indirectly, with other elements of the system.

Processor 4950 may include at least some out of (and thus may not include at least one out of):

Multiple spanning elements 4951(*q*).

Multiple merge elements 4952(*r*).

Object detector 4953.

Cluster manager 4954.

Controller 4955.

Selection unit 4956.

Object detection determination unit 4957.

Signature generator 4958.

Movement information unit 4959.

Identifier unit 4960.

While system 4900 includes a sensing unit 4902—is should be noted that it may receive sensed information from other sensors and/or that the sensing unit does not belong to the system. The system may receive information from one or more sensors located in the vehicle, associated with the vehicle, and/or located outside the vehicle.

Any method illustrated in the specification may be fully or partially executed by system 4900, and/or may be fully or partially executed by one or more other computerized system, and/or by one or more computerized systems—for example by task allocations between computerized systems, by a cooperation (for example—exchange of information, exchange of decisions, any allocation of resources, collaborative decision, and the like) between multiple computerized systems.

The one or more other computerized systems may be, for example, out-of-vehicle computerized system 4820 of FIG. 1N, any other out-of-vehicle computerized system, one or more other in-vehicle systems, a computerized device of a person within the vehicle, any computerized system outside the vehicle—including for example a computerized system of another vehicle.

An example of an other in-vehicle system is denoted 4830 in FIG. 1N and is located within vehicle 4800 that drives along road 4820.

System 4900 may obtain sensed information from any type of sensors—a camera, one or more sensors implemented using any suitable imaging technology instead of, or in addition to, a conventional camera, an infrared sensor, a radar, an ultrasound sensor, any electro-optic sensor, a radiography sensor, a LIDAR (light detection and ranging), telemetry ECU sensor, shock sensor, etc.

System 4900 and/or other in-vehicle system is denoted 4830 may use supervised and/or unsupervised learning to perform any method executed by them.

The other in-vehicle system 4830 may be an autonomous driving system, an advance driver assistance system, or may differ from an autonomous driving system and from an advance driver assistance system.

The other in-vehicle system 4830 may include processing circuitry 210, input/output (I/O) module 220, one or more sensors 233, and database 270. The processing circuitry 210 may execute any task is it assigned or programmed to perform in relation to any of the methods illustrate din the application. Alternatively—the other in-vehicle system 4830 may include another module for executing (alone or with the processing circuit) any such task. For example—the processing circuitry may execute instructions to provide an autonomous driving manager functionality. Alternatively—another circuit or module of the in-vehicle system 4830 may provide the autonomous driving manager functionality.

FIG. 1O illustrates method 7002 of generating a hybrid representation of a media unit.

Method 7002 may include a sequence of steps 7020, 7022, 7024 and 7026.

Step 7020 may include receiving or generating the media unit.

Step 7022 may include processing the media unit by performing multiple iterations, wherein at least some of the multiple iterations comprises applying, by spanning elements of the iteration, dimension expansion process that are followed by a merge operation.

Step 7024 may include selecting, based on an output of the multiple iterations, media unit regions of interest that contributed to the output of the multiple iterations.

Step 7026 may include providing a hybrid representation, wherein the hybrid representation may include (a) shape information regarding shapes of the media unit regions of interest, and (b) a media unit signature that includes identifiers that identify the media unit regions of interest.

Step 7024 may include selecting the media regions of interest per segment out of multiple segments of the media unit. See, for example, FIG. 2.

Step 7026 may include step 7027 of generating the shape information.

The shape information may include polygons that represent shapes that substantially bound the media unit regions of interest. These polygons may be of a high degree.

In order to save storage space, the method may include step 7028 of compressing the shape information of the media unit to provide compressed shape information of the media unit.

FIG. 1P illustrates method 8020 for scale invariant object detection.

Method 8020 may include a first sequence of steps that may include step 8022, 8024, 8026 and 8028.

Step 8022 may include receiving or generating a first image in which an object appears in a first scale and a second image in which the object appears in a second scale that differs from the first scale.

Step 8024 may include generating a first image signature and a second image signature.

The first image signature includes a first group of at least one certain first image identifier that identifies at least a part of the object.

The second image signature includes a second group of certain second image identifiers that identify different parts of the object.

The second group is larger than first group—as the second group has more members than the first group.

Step 8026 may include linking between the at least one certain first image identifier and the certain second image identifiers.

Step 8026 may include linking between the first image signature, the second image signature and the object.

Step 8026 may include adding the first signature and the second signature to a certain concept structure that is associated with the object.

Step 8028 may include determining whether an input image includes the object based, at least in part, on the linking. The input image differs from the first and second images.

The determining may include determining that the input image includes the object when a signature of the input image includes the at least one certain first image identifier or the certain second image identifiers.

The determining may include determining that the input image includes the object when the signature of the input image includes only a part of the at least one certain first image identifier or only a part of the certain second image identifiers.

The linking may be performed for more than two images in which the object appears in more than two scales.

Figure 1Q:
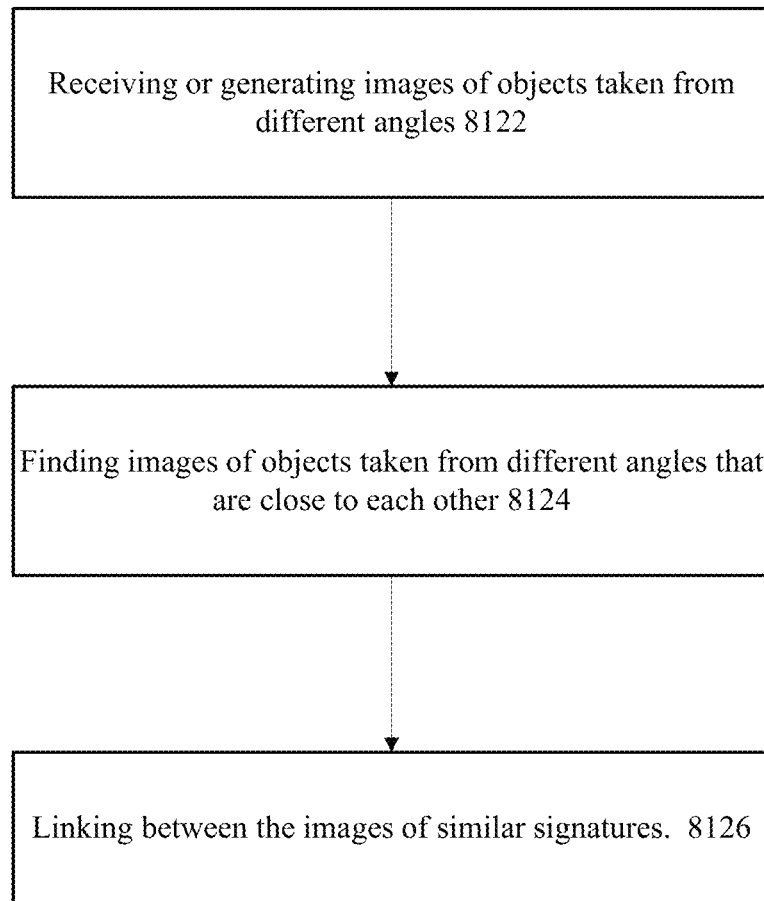
FIG. 1Q illustrates an example of a method.

FIG. 1Q illustrates method 8200 for object detection.

Method 8200 may include:

Step 8210 of receiving an input image.

Step 8212 of generating a signature of the input image.

Step 8214 of comparing the signature of the input image to signatures of a concept structure.

Step 8216 of determining whether the signature of the input image matches any of the signatures of the concept structure based on signature matching criteria, wherein each signature of the concept structure is associated within a signature matching criterion that is determined based on an object detection parameter of the signature.

Step 8218 of concluding that the input image comprises an object associated with the concept structure based on an outcome of the determining.

The signature matching criteria may be a minimal number of matching identifiers that indicate of a match. For example—assuming a signature that include few tens of identifiers, the minimal number may vary between a single identifier to all of the identifiers of the signature.

It should be noted that an input image may include multiple objects and that a signature of the input image may match multiple cluster structures. Method 8200 is applicable to all of the matching processes- and that the signature matching criteria may be set for each signature of each cluster structure.

Step 8210 may be preceded by step 8202 of determining each signature matching criterion by evaluating object detection capabilities of the signature under different signature matching criteria.

Step 8202 may include:

Step 8203 of receiving or generating signatures of a group of test images.

Step 8204 of calculating the object detection capability of the signature, for each signature matching criterion of the different signature matching criteria.

Step 8206 of selecting the signature matching criterion based on the object detection capabilities of the signature under the different signature matching criteria.

The object detection capability may reflect a percent of signatures of the group of test images that match the signature.

The selecting of the signature matching criterion comprises selecting the signature matching criterion that once applied results in a percent of signatures of the group of test images that match the signature that is closets to a predefined desired percent of signatures of the group of test images that match the signature.

The object detection capability may reflect a significant change in the percent of signatures of the group of test images that match the signature. For example—assuming, that the signature matching criteria is a minimal number of matching identifiers and that changing the value of the minimal numbers may change the percentage of matching test images. A substantial change in the percentage (for example a change of more than 10, 20, 30, 40 percent) may be indicative of the desired value. The desired value may be set before the substantial change, proximate to the substantial change, and the like.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on non-transitory computer readable media permanently, removably or remotely coupled to an information processing system. The non-transitory computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for providing a prediction of a radius of a motorcycle turn, the method comprises:
   determining that the motorcycle is about to turn;
   predicting values of multiple radius of turn impacting (RTI) parameters; wherein the multiple RTI parameters are selected out of a group of parameters, wherein the selection was made during a machine learning training process, and the group of parameters comprises motorcycle kinematic parameters;
   determining, based on the determined values of the multiple RTI parameters, the estimated radius of the motorcycle turn; and
   performing a driving related operation based on the estimated radius of the motorcycle turn.

2. The method according to claim 1 comprising searching a matching concept structure out of multiple concept structures, wherein each concept structure comprises radius metadata indicative of the estimated radius of the motorcycle turn, and one or more unique reference combinations of values of the multiple RTI parameters, wherein the matching concept structure comprises a unique reference combination of values of the multiple RTI parameters that matches the determined values of the multiple RTI parameters.

3. The method according to claim 2 comprising performing at least one search iteration for finding the matching concept structure, wherein when a search iteration that utilized a sub-set of the multiple RTI parameters found two or more matching concept structures the executing another search iteration that utilizes the sub-set of the multiple RTI parameters and at least one additional RTI parameter.

4. The method according to claim 2 wherein the multiple concept structures are multiple clusters.

5. The method according to claim 2 wherein at least some of the multiple concept structures are associated with a safety parameter, wherein the performing of the driving related operation is responsive to the safety parameter.

6. The method according to claim 5 wherein a safety parameter associated with a concept structure is determined during the machine learning training process when a certain radius of turn consistently is associated with outcomes of a same safety level.

7. The method according to claim 2 comprising generating an alert when a matching concept structure is tagged as dangerous.

8. The method according to claim 1 wherein the performing of the driving related operation comprising providing a driver perceivable indication about a projected trajectory of the motorcycle.

9. The method according to claim 1 wherein the performing of the driving related operation comprises providing a driver perceivable indication about a projected trajectory of the motorcycle.

10. The method according to claim 1 wherein the performing of the driving related operation comprises displaying to the driver a projected trajectory of the motorcycle within an environment of the motorcycle.

11. The method according to claim 10 wherein the projected trajectory of the motorcycle within an environment of the motorcycle is taken from a bird eye view.

12. The method according to claim 1 wherein the group of parameters comprises environmental parameters.

13. A non-transitory computer readable medium for providing a prediction of a radius of a motorcycle turn, the non-transitory computer readable medium comprises:
   determining that the motorcycle is about to turn;
   predicting values of multiple radius of turn impacting (RTI) parameters; wherein the multiple RTI parameters are selected out of a group of parameters, wherein the selection was made during a machine learning training process, and the group of parameters comprises motorcycle kinematic parameters;

determining, based on the determined values of the multiple RTI parameters, the estimated radius of the motorcycle turn; and performing a driving related operation based on the estimated radius of the motorcycle turn.

14. The non-transitory computer readable medium according to claim 13 that stores instructions for searching a matching concept structure out of multiple concept structures, wherein each concept structure comprises radius metadata indicative of the estimated radius of the motorcycle turn, and one or more unique reference combinations of values of the multiple RTI parameters, wherein the matching concept structure comprises a unique reference combination of values of the multiple RTI parameters that matches the determined values of the multiple RTI parameters.

15. The non-transitory computer readable medium according to claim 14 that stores instructions for performing at least one search iteration for finding the matching concept structure, wherein when a search iteration that utilized a sub-set of the multiple RTI parameters found two or more matching concept structures the executing another search iteration that utilizes the sub-set of the multiple RTI parameters and at least one additional RTI parameter.

16. The non-transitory computer readable medium according to claim 14 wherein the multiple concept structures are multiple clusters.

17. The non-transitory computer readable medium according to claim 14 wherein at least some of the multiple concept structures are associated with a safety parameter, wherein the performing of the driving related operation is responsive to the safety parameter.

18. The non-transitory computer readable medium according to claim 17 wherein a safety parameter associated with a concept structure is determined during the machine learning training process when a certain radius of turn consistently is associated with outcomes of a same safety level.

19. The non-transitory computer readable medium according to claim 14 that stores instructions for generating an alert when a matching concept structure is tagged as dangerous.

20. The non-transitory computer readable medium according to claim 13 that stores instructions for providing a driver perceivable indication about a projected trajectory of the motorcycle.

* * * * *